US012297668B2

(12) United States Patent
Hammond et al.

(10) Patent No.: US 12,297,668 B2
(45) Date of Patent: May 13, 2025

(54) COMPRESSION LATCH

(71) Applicant: Southco, Inc., Concordville, PA (US)

(72) Inventors: Eric Howard Hammond, Broomall, PA (US); David A. Minnich, Lincoln University, PA (US); Kevin A. McCloskey, West Chester, PA (US)

(73) Assignee: Southco, Inc., Concordville, PA (US)

( * ) Notice: Subject to any disclaimer, the term of this patent is extended or adjusted under 35 U.S.C. 154(b) by 131 days.

(21) Appl. No.: 17/794,368

(22) PCT Filed: Jan. 14, 2021

(86) PCT No.: PCT/US2021/013339

§ 371 (c)(1),
(2) Date: Jul. 21, 2022

(87) PCT Pub. No.: WO2021/150410

PCT Pub. Date: Jul. 29, 2021

(65) Prior Publication Data

US 2023/0340804 A1 Oct. 26, 2023

Related U.S. Application Data

(60) Provisional application No. 62/964,824, filed on Jan. 23, 2020.

(51) Int. Cl.
*E05B 81/06* (2014.01)
*E05B 81/20* (2014.01)
(Continued)

(52) U.S. Cl.
CPC .............. *E05B 81/06* (2013.01); *E05B 81/20* (2013.01); *E05B 81/34* (2013.01); *E05B 81/90* (2013.01)

(58) Field of Classification Search
CPC .......... E05B 81/06; E05B 81/20; E05B 81/34; E05B 81/42; E05B 81/90;
(Continued)

(56) References Cited

U.S. PATENT DOCUMENTS 4,976,478 A 12/1990 Acciacca et al.
7,090,264 B2 * 8/2006 Dzurko ................ E05B 85/243 292/201
(Continued)

FOREIGN PATENT DOCUMENTS

DE 3721962 A1 1/1989
DE 102004046162 A1 * 4/2005 ............ B60R 21/38
(Continued)

OTHER PUBLICATIONS

International Preliminary Report on Patentability and Written Opinion for International Application No. PCT/US2021/013339, issued Jul. 26, 2022, 8 pages.
(Continued)

*Primary Examiner* — Carlos Lugo
(74) *Attorney, Agent, or Firm* — Buchanan Ingersoll & Rooney PC

(57) ABSTRACT

A compression latch assembly (CLA) includes a latch subassembly that is movably mounted to a housing and includes a frame, a pawl pivotably connected to the frame and biased to move from a closed position to an open position, a trigger pivotably connected to the frame and movable between a home position and a release position, and a release arm pivotably connected to the frame. The release arm has a cam follower that is positioned to engage a cam on the housing. A motor unit is configured for moving the latch subassembly between extended and retracted positions. In the course of moving from the retracted position to the extended position, the cam is configured to urge the cam follower to rotate the
(Continued)

trigger from the home position to the release position, which causes the trigger to release the pawl, which causes the pawl to move to the open position.

21 Claims, 36 Drawing Sheets

(51) Int. Cl.
*E05B 81/34* (2014.01)
*E05B 81/90* (2014.01)

(58) Field of Classification Search
CPC ......... Y10T 292/1047; Y10T 292/1082; Y10S 292/51; Y10S 292/55; Y10S 292/56; Y10S 292/60
See application file for complete search history.

(56) References Cited

U.S. PATENT DOCUMENTS

| | | | | |
|---|---|---|---|---|
| 7,938,458 | B1 * | 5/2011 | Zweibohmer | E05B 85/045 292/DIG. 60 |
| 8,584,787 | B2 * | 11/2013 | Hwang | B60R 21/38 180/274 |
| 9,546,503 | B2 * | 1/2017 | Krueger | E05B 47/06 |
| 10,309,130 | B2 * | 6/2019 | Schiffer | E05B 83/24 |
| 10,648,202 | B2 * | 5/2020 | Scholz | E05B 81/68 |
| 10,676,962 | B1 * | 6/2020 | Weinerman | E05B 47/0001 |
| 11,230,255 | B2 * | 1/2022 | Sasaki | E05B 77/08 |
| 2018/0163439 | A1 | 6/2018 | Patane et al. | |

FOREIGN PATENT DOCUMENTS

| | | | | |
|---|---|---|---|---|
| DE | 102005024588 A1 * | 11/2006 | E05B 81/14 |
| DE | 102009018188 A1 * | 11/2010 | E05B 79/20 |
| EP | 1455040 A2 | 9/2004 | |
| EP | 2985401 A1 * | 2/2016 | E05B 81/06 |
| FR | 2889554 A1 * | 2/2007 | E05B 81/14 |

OTHER PUBLICATIONS

International Search Report and Written Opinion for International Application No. PCT/US2021/013339, dated May 18, 2021, 9 pages.

Office Action (The First Office Action) issued Jan. 15, 2025, by the State Intellectual Property Office of People's Republic of China in corresponding Chinese Patent Application No. 202180010936.0 and an English translation of the Office Action. (21 pages).

* cited by examiner

COMPRESSION LATCH

CROSS-REFERENCE TO RELATED APPLICATION

This Application is a U.S. National Phase Patent Application of PCT Patent Application No. PCT/US2021/013339, filed Jan. 14, 2021, which is related to, and claims the benefit of priority of U.S. Provisional Application No. 62/964,824, entitled COMPRESSION LATCH, filed on Jan. 23, 2020, the contents of each of which are incorporated herein by reference in their entirety for all purposes.

FIELD OF THE INVENTION

The present invention relates to the field of latches or connector systems configured to provide a mechanical connection between adjacent components, and particularly to latch systems for securing doors, drawers or panels in the closed position. The door may be, for example, a door for a baggage storage compartment such as are found on recreational vehicles, buses, trains, etc.

BACKGROUND OF THE INVENTION

Door closure systems, such as are used in a baggage storage compartment, and the like, typically include a housing, a door, and a latch that cooperates with one or more strikers to hold the door in the closed position to cover the housing. It has been found that there is a continuing need to improve upon or provide alternatives to existing door closure systems.

SUMMARY OF THE INVENTION

According to a first aspect of the present invention, there is provided a compression latch assembly (CLA) comprising a housing including a cam surface and a latch subassembly that is movably mounted to the housing. The latch subassembly comprises (i) a frame, (ii) a pawl pivotably connected to said frame and biased to move from a closed position to an open position, said pawl including a surface that is configured for receiving a striker, (iii) a trigger pivotably connected to said frame and movable between a home position in which the trigger is positioned to retain said pawl in the closed position, and a release position in which the trigger is not positioned to retain said pawl in the closed position, and (iv) a release arm pivotably connected to said frame and biased to engage said trigger, said release arm having a cam follower that is positioned to engage said cam of said housing. A motor unit is mounted to the housing for moving the latch subassembly with respect to the housing between extended and retracted positions, wherein in the course of moving from the retracted position to the extended position, the cam is configured to urge the cam follower to rotate the trigger from the home position to the release position, which causes the trigger to release the pawl, which causes the pawl to move to the open position.

According to another aspect of the present invention, there is provided a method for operating a compression latch assembly (CLA). The method comprises activating a motor unit, which causes a latch subassembly to move from a retracted position toward an extended position, which causes a cam follower on a release arm to bear on one surface of a stationary cam, which causes the release arm to bear on and pivot a trigger, which causes the trigger to move to a release position in which the trigger separates from a pawl and the pawl moves to an open position.

According to yet another of the present invention, there is provided latch subassembly of a compression latch assembly (CLA). The latch subassembly comprises a frame and a pawl pivotably connected to said frame and biased to move from a closed position to an open position, said pawl including a surface that is configured for receiving a striker. A trigger is pivotably connected to said frame and movable between a home position in which the trigger is positioned to retain said pawl in the closed position, and a release position in which the trigger is not positioned to retain said pawl in the closed position. A release arm is pivotably connected to said frame and biased to engage said trigger, said release arm having a cam follower that is positioned to engage a cam of the CLA. The latch subassembly is configured to move between extended and retracted positions, wherein in the course of moving from the retracted position to the extended position, the cam follower is configured to be urged by the cam to rotate the trigger from the home position to the release position, which causes the trigger to release the pawl, which causes the pawl to move to the open position.

BRIEF DESCRIPTION OF THE DRAWINGS

The above and other aspects and features of the present invention will become more apparent to those of ordinary skill in the art by describing in detail exemplary embodiments thereof with reference to the attached drawings.

In FIG. 4A, the CLA is shown in an open and unlocked configuration, and the LS of FIGS. 3A-3C is shown in a fully extended state. In FIG. 4B, the CLA is shown in a closed and locked configuration, and the LS of FIGS. 3A-3C is shown in a fully extended state. In FIG. 4C, the CLA is shown in a closed and locked configuration, and the LS of FIGS. 3A-3C is shown in a fully retracted state. In FIG. 4D, the CLA is shown in an open and unlocked configuration, and the LS of FIGS. 3A-3C is shown in a partially extended state. In FIG. 4E, the CLA is shown in an open and unlocked configuration (due to actuation of a manually operated release trigger 40), and the LS of FIGS. 3A-3C is shown in a fully retracted state.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

A first embodiment of a compression latch assembly (CLA) 10 incorporating aspects of the present invention is illustrated in FIGS. 1A through 4E. CLA 10 may be incorporated into a door system of a baggage storage compartment.

Figure 25:
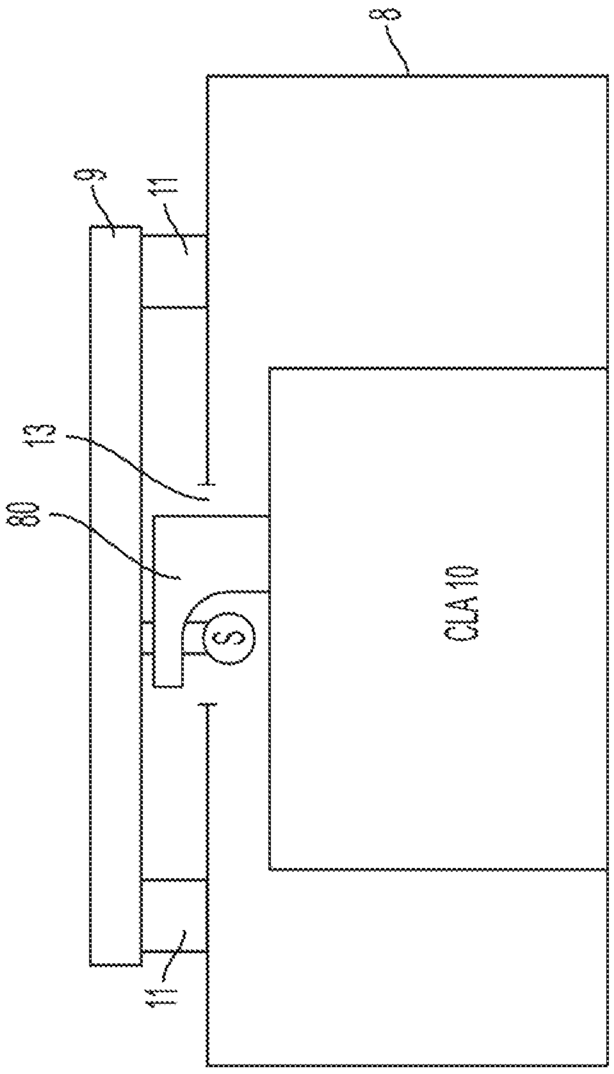
FIG. 25 depicts a basic schematic of CLA mounted to a stationary structure and interacting with a moveable door.
Figure 26C:
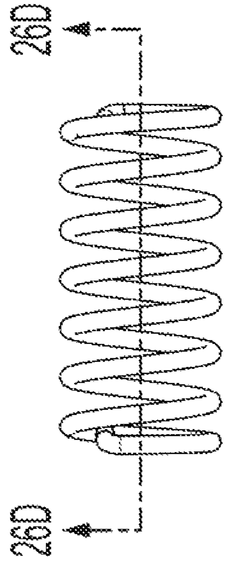
FIGS. 26A-26D depict isometric, top plan, side elevation and cross-sectional side views, respectively, of a compression spring of the housing and motor unit (HMU) of FIGS. 2A and 2B.
Figure 26D:
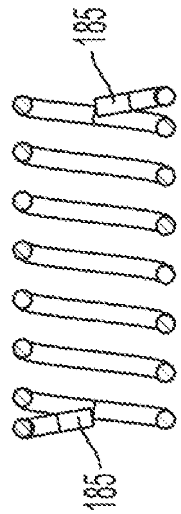
Figure 26B:
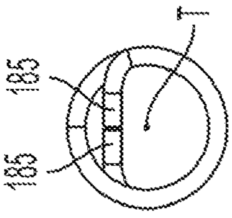
Figure 26A:
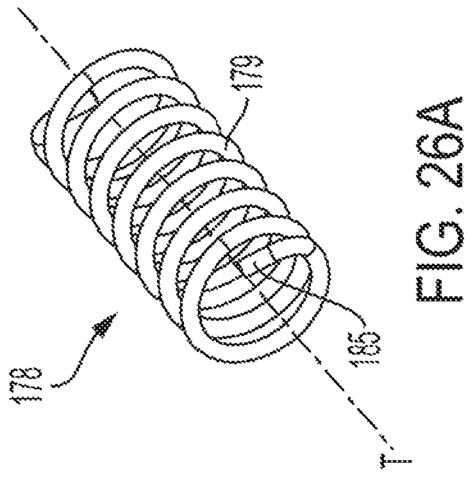

As best shown in the schematic view of FIG. 25, and according to one exemplary use of CLA 10, CLA 10 may be mounted to a stationary structure 8, such as a storage compartment, for securing a movable door 9 (to which a striker S is attached) in a closed position over an opening 13 formed in the stationary structure 8. One or more seals 11 are disposed at the interface between the door 9 and the opening 13. Once the striker S becomes locked by CLA 10, CLA 10 is capable of moving door 9 closer to opening 13, which compresses seals 11.

CLA 10 generally comprises a latch subassembly (LS) 12 and a housing and motor unit (HMU) 14.

Figure 1B:
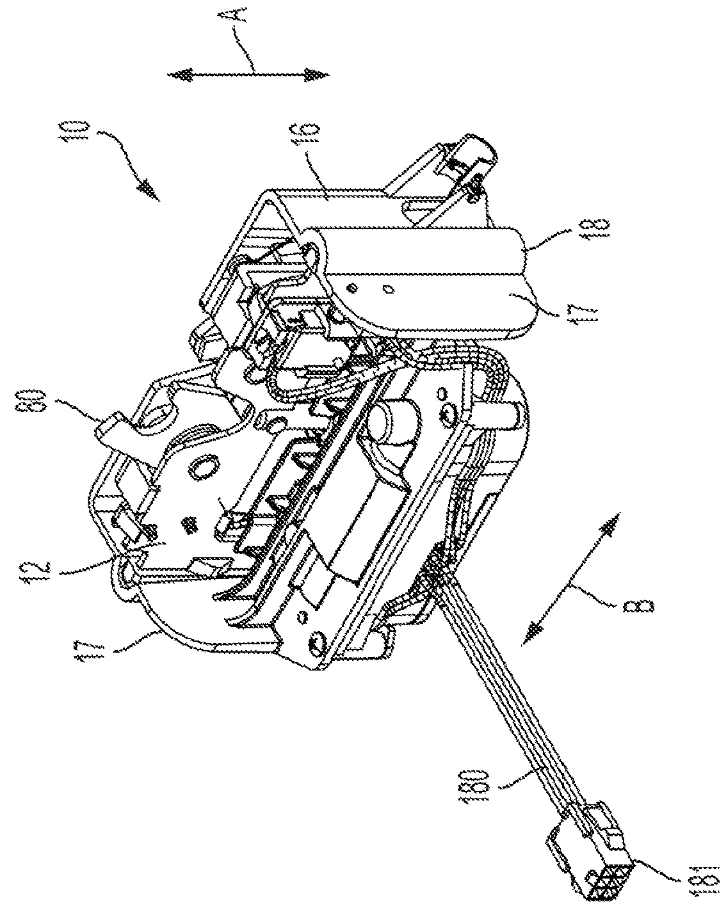
FIG. 1B is another front isometric view of the compression latch assembly (CLA), with the latch shown in an open and fully extended state.
Figure 1A:
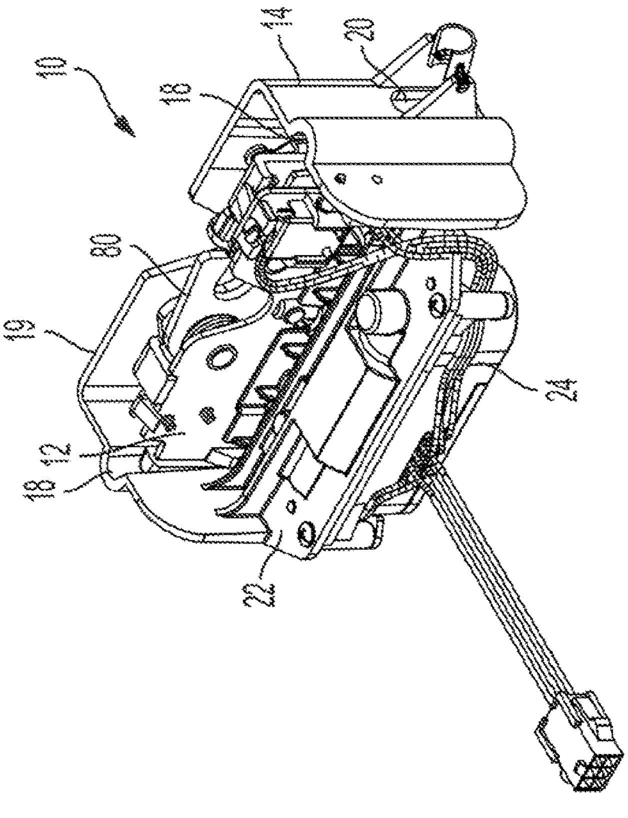
FIG. 1A is a front isometric view of a first exemplary embodiment of a compression latch assembly taken from the front, top and right sides thereof, with the latch shown in a closed and fully retracted state.
Figure 1E:
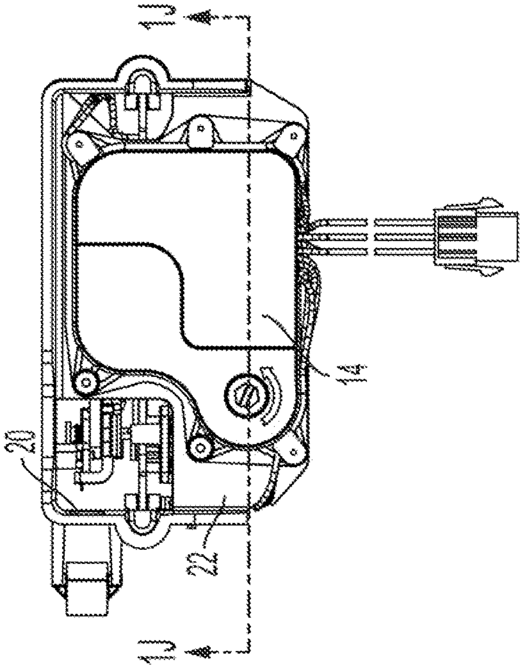
FIGS. 1C, 1D, 1E, 1F, 1G, 1H, and 1I are top plan, right elevation, bottom plan, rear elevation (fully extended state shown), rear elevation (fully retracted state shown), front elevation (fully retracted state shown), and partially exploded views, respectively, of the CLA of FIGS. 1A and 1B.
Figure 1D:
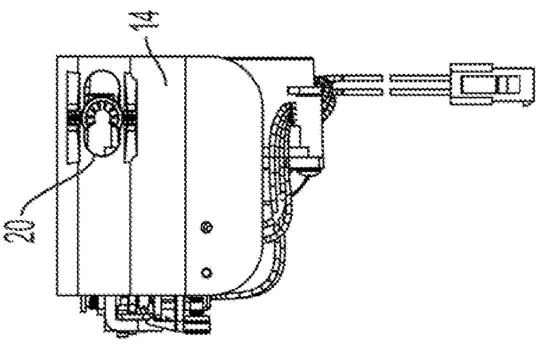
Figure 1C:
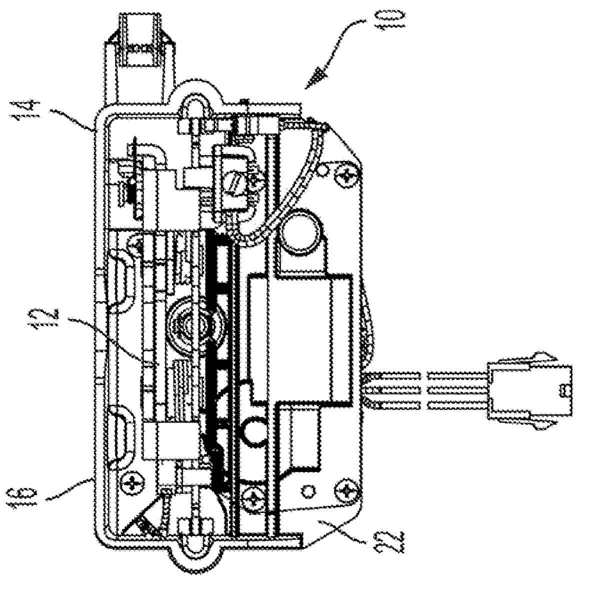
Figure 1G:
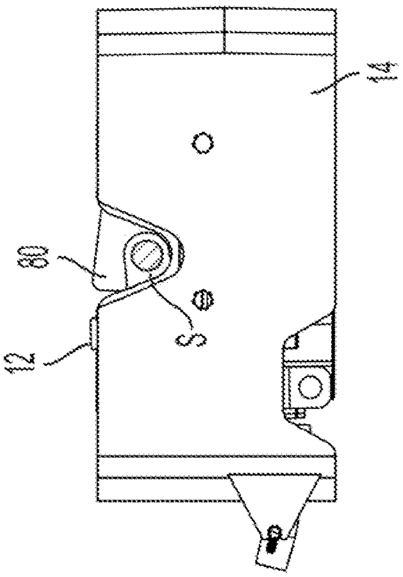
Figure 1F:
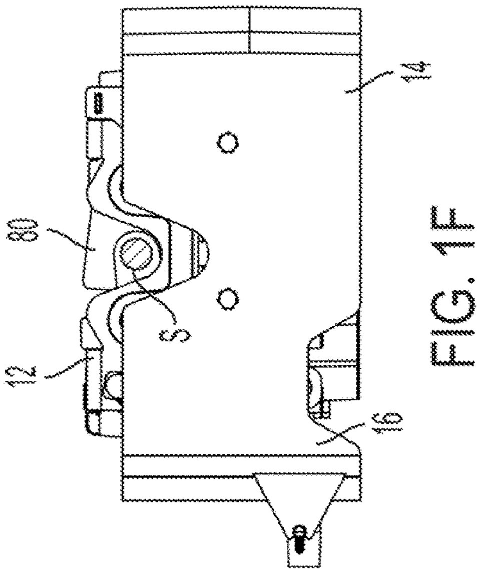
Figure 1I:
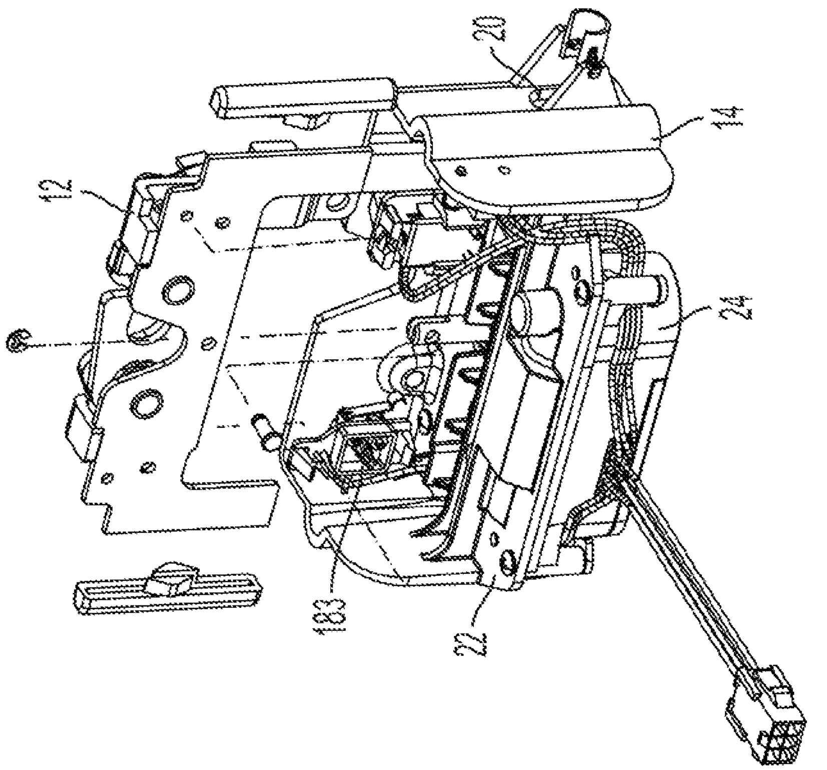
Figure 1H:
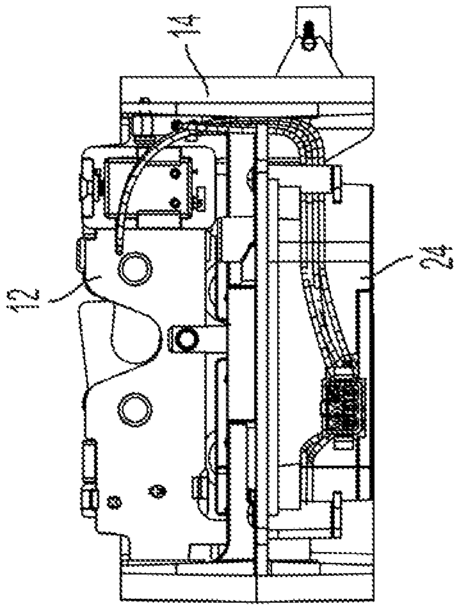

HMU 14 may be mounted to the above described stationary structure. LS 12 translates with respect to HMU 14 between extended and retracted states. The extended position is shown in FIGS. 1B, 1F and 1H, whereas the retracted state of LS 12 is shown in FIGS. 1A and 1G, for example. HMU 14 is maintained in a stationary position during motion of LS 12 between the retracted and extended states.

LS 12 is convertible between an open/unlocked state and a closed/locked state. LS 12 interacts with a striker S (shown in FIGS. 1F and 1G) to maintain a moveable door, to which the striker S is fixedly connected, in a closed and locked position. In the open/unlocked state of LS 12, LS 12 is separated and/or detached from the striker S, and, consequently, the moveable door can move with respect to CLA 10. In the closed/locked state of LS 12, LS 12 holds striker S captive in HMU 14 such that striker S cannot be removed from CLA 10.

LS 12 also moves (i.e., translates) with respect to HMU 14 between retracted and extended states. As noted above, a seal may be disposed at the interface between the moveable door and the opening. In a retracted and closed/locked state of LS 12, the seal between the door and the opening for the door is compressed. In the extended and closed/locked states of LS 12, the seal between the door and the opening for the door is either uncompressed or compressed to a lesser extent as compared to its degree of compression in the retracted state of LS 12.

Referring now to the features of HMU 14 shown in FIGS. 1A-2B, HMU 14 generally includes a C-shaped housing part 16 to which other components of CLA 10 are connected.

Figure 4E:
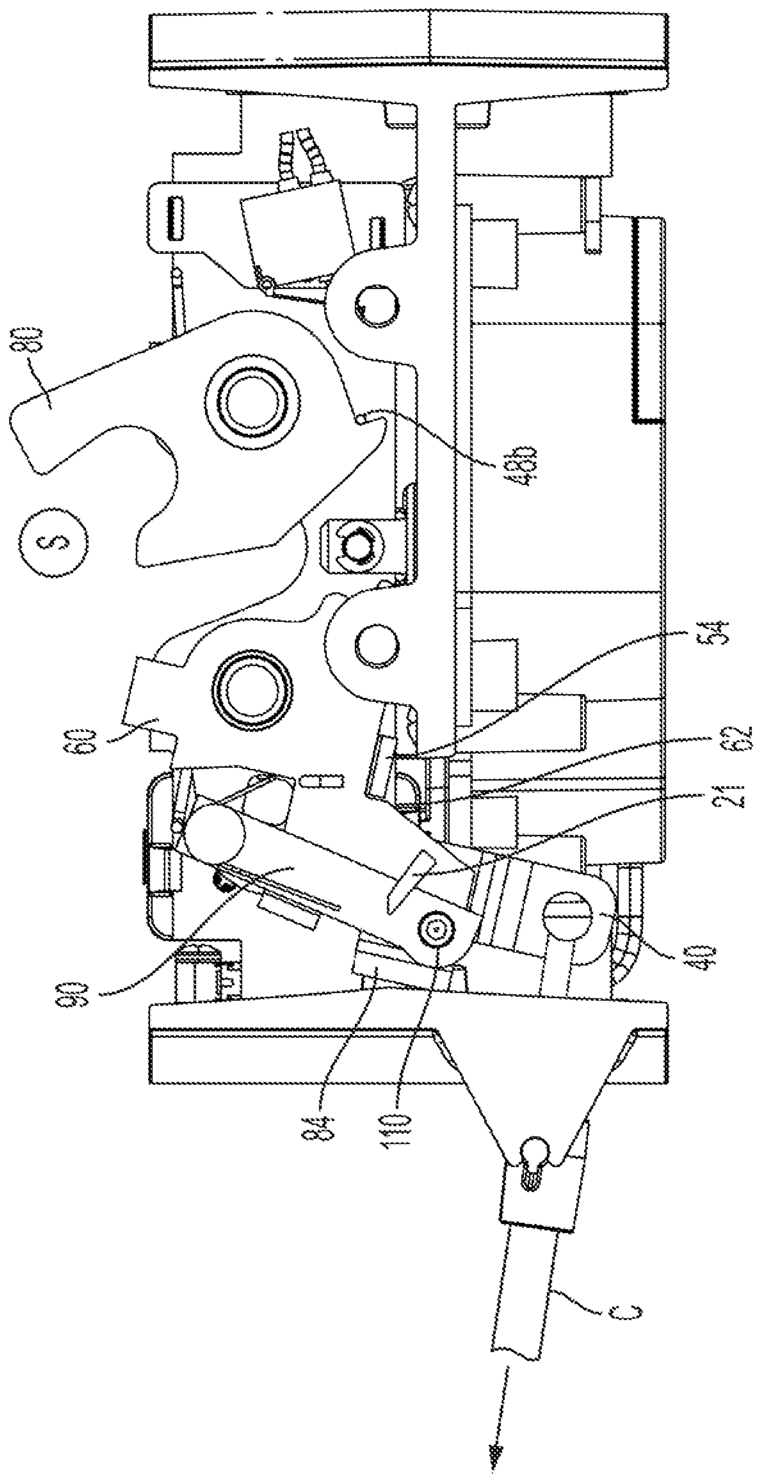
Figure 5C:
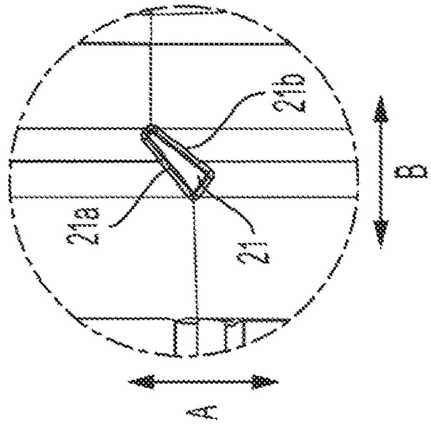
FIG. 5C is a detailed view of FIG. 5B.
Figure 5B:
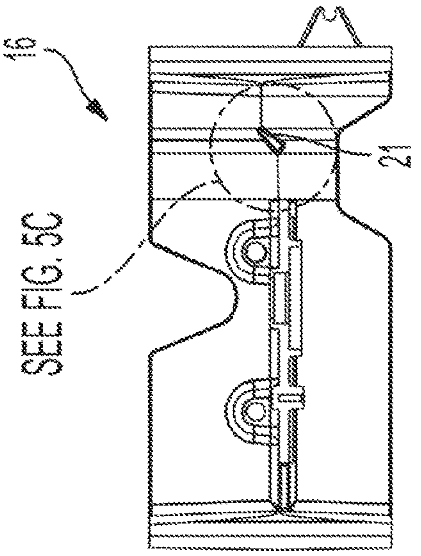
FIGS. 5A and 5B depict isometric and elevation views, respectively, of the housing part of the housing and motor unit (HMU) of FIGS. 2A and 2B.
Figure 5A:
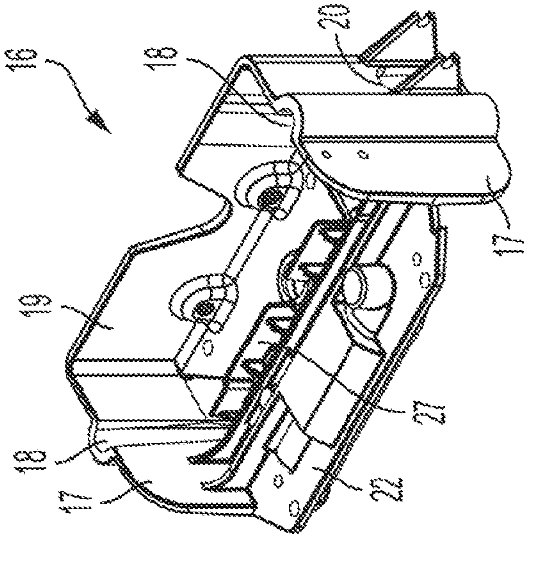

Housing part 16, which is also shown in FIGS. 5A and 5B, includes a central portion 19 extending between two opposing ends 17 that extend orthogonally to the central portion 19. Longitudinally extending channels 18 are disposed on the opposing ends 17 of housing part 16. LS 12 is positioned within and between channels 18, and LS 12 can translate in a longitudinal direction "A" within channels 18. Channels 18 may be otherwise described as slots or rails, for example. An opening 20 is defined on one end of housing part 16. In an assembled form of CLA 10, a manually-operated lever or cable (see FIG. 4E) is positioned though opening 20 and connects to a mechanical override trigger (MOT) 40 of LS 12.

A transversely-extending shelf 22 extends across the interior of housing part 16. The transverse direction is depicted by arrows "B" in FIG. 1B. Shelf 22 may be either integral with or connected to housing part 16. A motor unit (MU) 24 is fixedly mounted to the underside of shelf 22. MU 24 includes a motor that translates a shaft 26 of LS 12 in a longitudinal direction. Further details of motor unit 24 are described in greater detail with reference to FIGS. 2B, 6A and 6B.

A cam 21 in the form of a projecting polygon or triangle is defined on an interfacing surface of central portion 19. Cam 21 includes an angled top side 21*a* and an angled bottom side 21*b*. Sides 21*a* and 21*b* are oblique with respect to the transverse axis B. As will be described in detail with reference to FIGS. 4A-4E, the sloping surfaces of cam 21 interacts with a pin 110 fixed to a release arm 90 to cause unlocking of LS 12 during operation of MU 24.

A rib 27 extends to an elevation above shelf 22. Rib 27, which may be referred to as an anti-fouling rib, is intended to reduce of likelihood of objects being pinched between LS 12 and housing part 16.

Figure 3C:
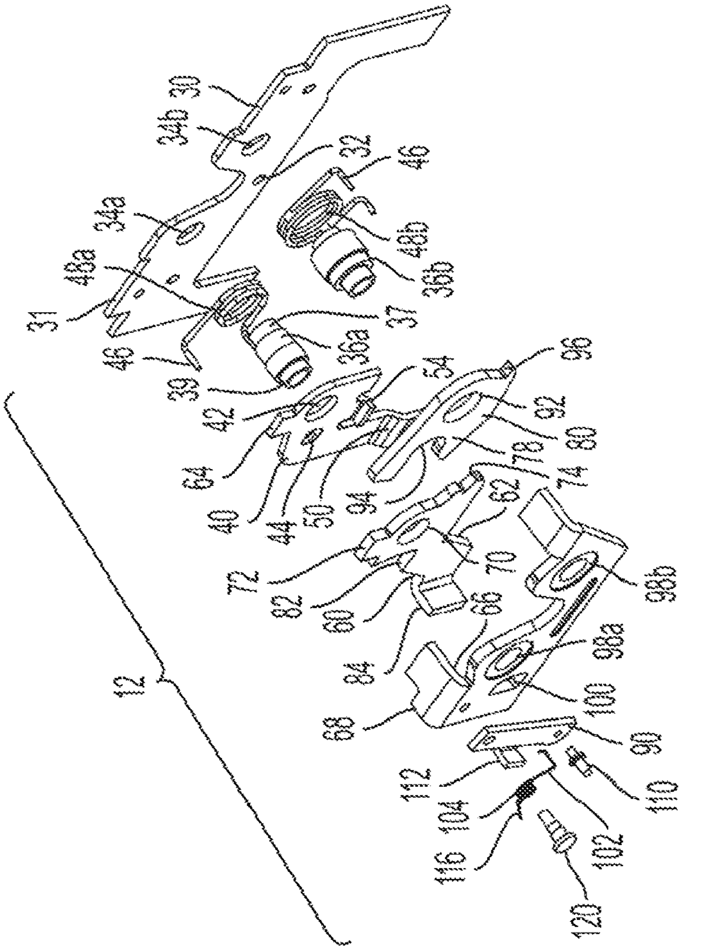
FIGS. 3A, 3B and 3C are rear elevation, top plan and exploded views, respectively, of a latch subassembly (LS) of the CLA of FIG. 1A.
Figure 3B:
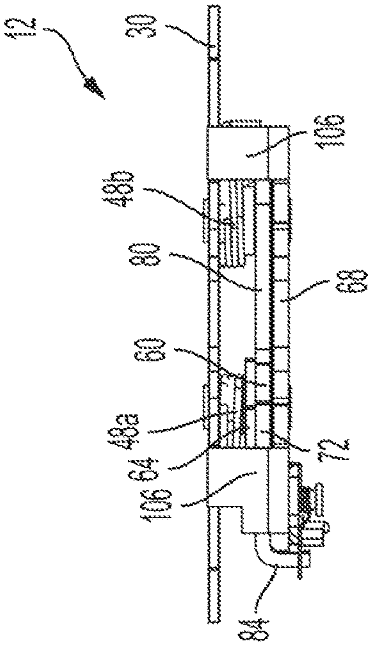
Figure 3A:
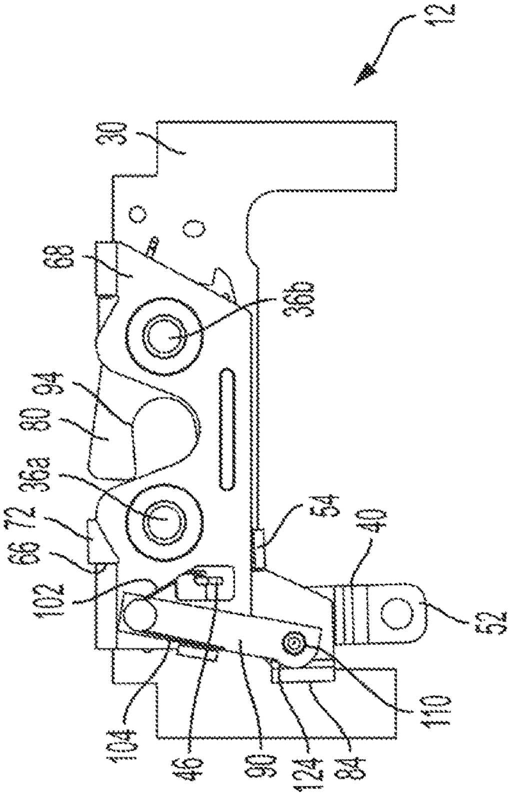
Figure 24:
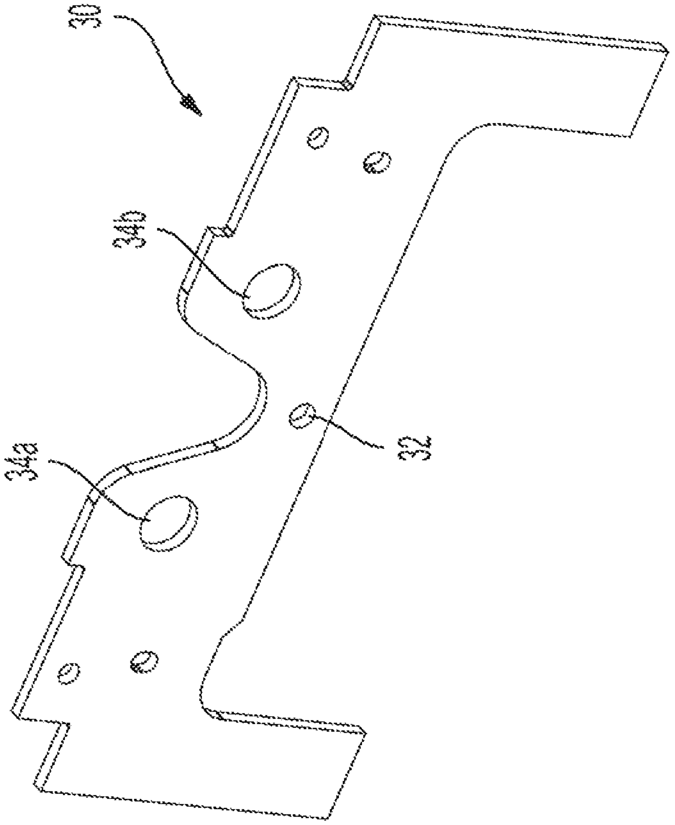
FIG. 24 depicts an isometric view of a support plate of the latch subassembly (LS) of FIGS. 3A-3C.

Referring now to the features of LS 12 shown in FIGS. 3A-3C, LS 12 generally includes a support plate 30 in the form of a flat sheet of material. Support plate 30, which is also shown in FIG. 24, includes a hole 32 for connecting to the shaft 26 by a fastener (such as a pin, rivet or other connection device). Two openings 34*a/b* are formed in plate 30. End 37 of stepped pin 36*a* is fixedly mounted to hole 34*a* while end 37 of stepped pin 36*b* is fixedly mounted to hole 34*b*.

Figure 17:
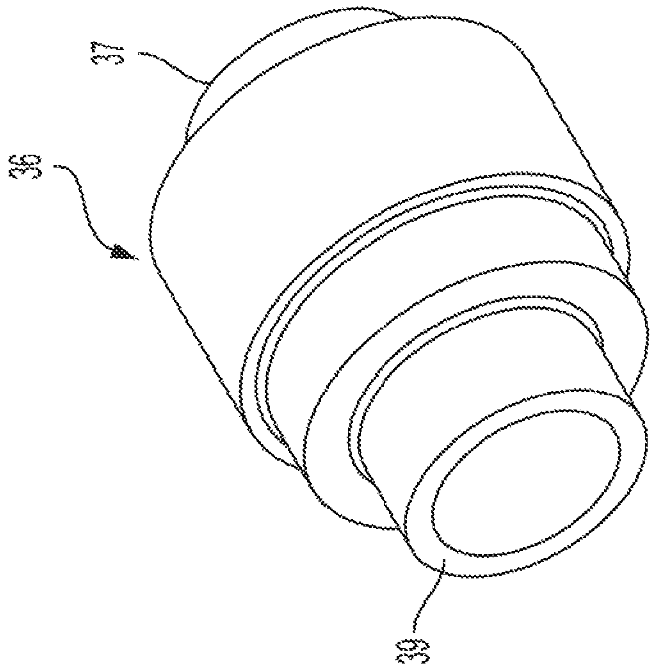
FIG. 17 depicts an isometric view of a pin of the latch subassembly (LS) of FIGS. 3A-3C.

The pins 36*a* and 36*b* may be referred to collectively or individually as pin(s) 36. Each pin 36 has multiple diameters forming steps along its length. It is noted that pins 36*a* and 36*b* differ slightly. One of the pins 36 is shown in FIG. 17.

Figure 15:
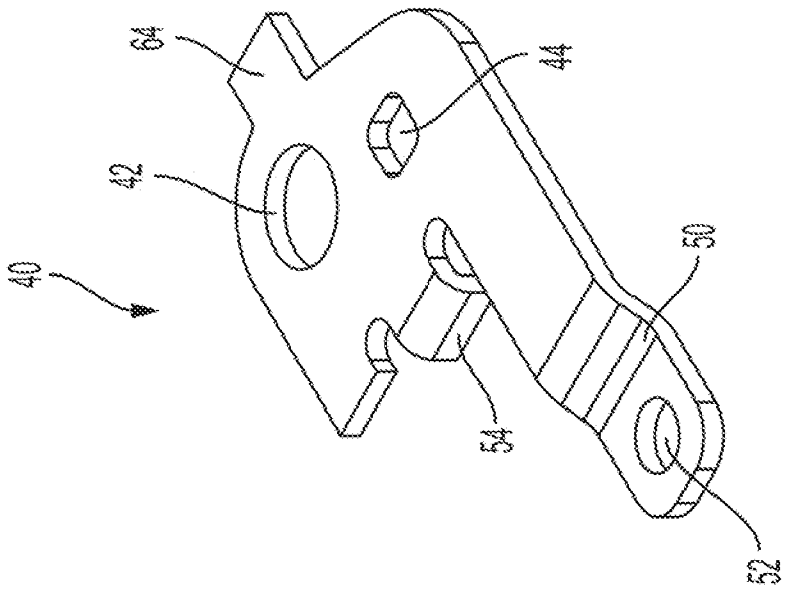
FIG. 15 depicts an isometric view of a mechanical override trigger (MOT) of the latch subassembly (LS) of FIGS. 3A-3C.

A mechanical override trigger (MOT) 40, which is also shown in FIG. 15, is a bent sheet of material comprising a first opening 42 for receiving an end 39 of pin 36*a*, a second opening 44 through which one leg 46 of a first torsion spring 48*a* is positioned, a leg 50 protruding downwardly and having an opening 52 for connecting to the above-described lever or cable for actuating MOT 40, an outwardly protruding bent tab 54 that is positioned to bear on a surface 62 of a trigger 60 of LS 12, and an upwardly protruding tab 64 that is positioned to bear on a surface 66 of a housing plate 68 of LS 12. Interference between tab 64 and surface 66 of housing plate 68 limits counterclockwise rotation (as viewed in FIG. 3A) of MOT 40 beyond a pre-determined extent.

Figure 18B:
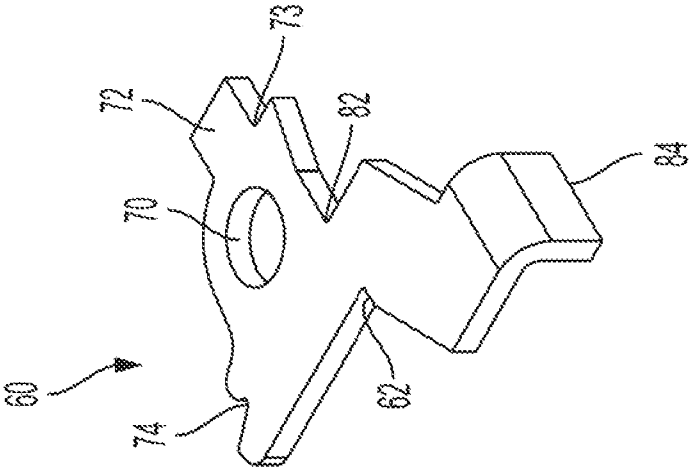
FIGS. 18A and 18B depict isometric views of a trigger of the latch subassembly (LS) of FIGS. 3A-3C.
Figure 18A:
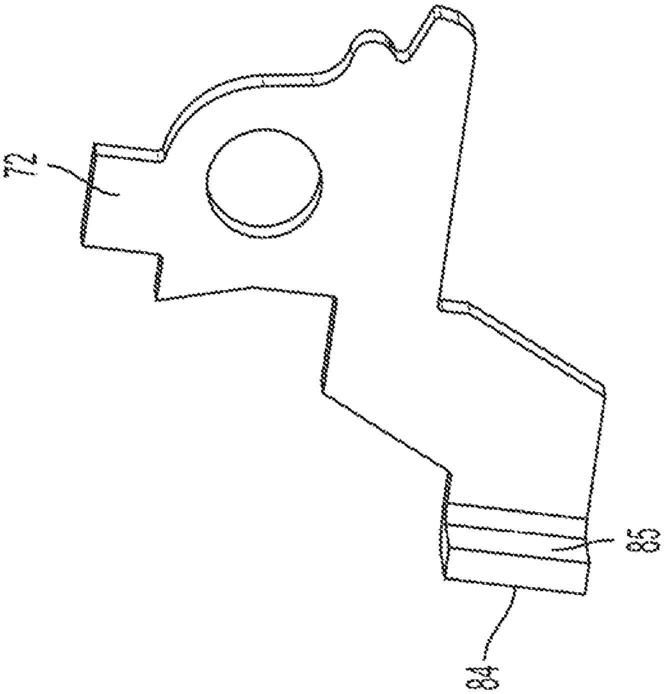

Trigger 60, which is also shown in FIG. 18A, is a bent sheet of material comprising an opening 70 for receiving an end 39 of pin 36*a*, an upwardly protruding tab 72 that is positioned to bear on surface 66 of housing plate 68 of LS 12, a c-shaped or v-shaped cutout or notch 74 that is configured to interact with a nose 78 of pawl 80, a cut-out defining a bearing surface 82 upon which the leg 46 of the spring 48*a* is positioned, and an outwardly projecting tab 84 upon which a release arm 90 can bear. Interference between tab 72 and surface 66 of housing plate 68 limits counterclockwise rotation (as viewed in FIG. 3A) of trigger 60 beyond a pre-determined extent. It is noted that MOT 40 and trigger 60 are separate components serving separate purposes, however, in a different embodiment, those two components could be combined into a single unitary component.

Figure 16:
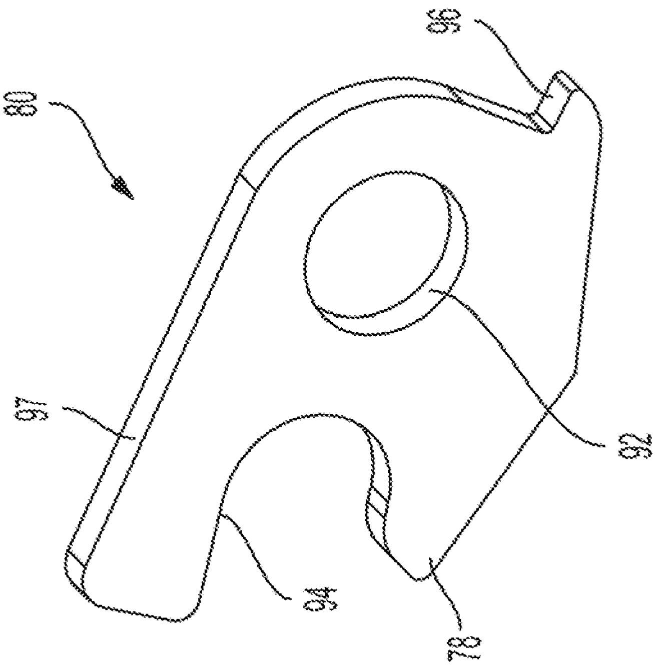
FIG. 16 depicts an isometric view of a pawl of the latch subassembly (LS) of FIGS. 3A-3C.

Pawl 80, which is also shown in FIG. 16, is a flat sheet of material comprising a rounded or angled projection in the form of a nose 78, an opening 92 for receiving an end 39 of pin 36*b*, a semi-circular or rounded surface 94 for receiving the striker S, and a tab defining a bearing surface 96 upon which one leg 46 of spring 48*b* rests. The other leg 46 of spring 48*b* rests on a surface of housing plate 68. Spring 48*b* biases pawl 80 to the open position shown in FIG. 1B, where surface 97 (FIG. 16) of pawl 80 is limited by surface 67 (FIG. 23) of housing plate 68.

Torsion spring 48*a* includes (i) a coiled section, (ii) a first leg 46 that passes through opening 44 of MOT 40 and rests on bearing surface 82 of trigger 60, and (iii) a second leg 46 that rests on an underside surface of arm 106 of housing plate 68. Torsion spring 48*a* biases trigger 60 to the home position shown in FIGS. 3A and 4A, for example. In the home position of trigger 60, notch 74 of trigger 60 is ready to receive nose 78 of pawl 80 for maintaining CLA 10 in a closed and locked state.

Figure 23:
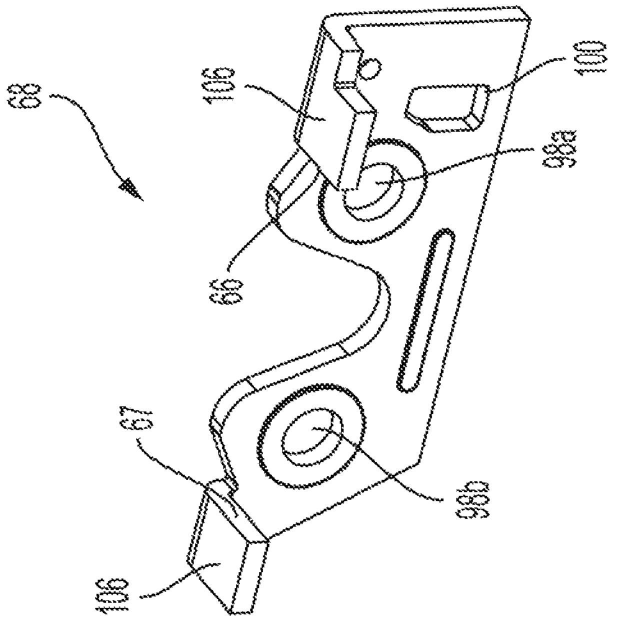
FIG. 23 depicts an isometric view of a housing plate of the latch subassembly (LS) of FIGS. 3A-3C.

Housing plate 68, which is also shown in FIG. 23, is a bent sheet of material comprising one opening 98*a* for receiving an end 39 of pin 36*a*, another opening 98*b* for receiving an end 39 of pin 36*b*, an opening 100 upon which a leg 102 of a torsion spring 104 bears, and two arms 106 extending outwardly therefrom that are configured to be positioned on the top end 31 of plate 30. It is noted that opening 100 is sized large enough to accommodate movement of the leg 46 of spring 48*a*, however, the leg 46 is not actually positioned on a perimeter surface of opening 100.

End 39 of each pin 36*a/b* is swaged to housing plate 68, while end 37 of each pin 36*a/b* is swaged to support plate 30. Pins 36 captivate the components of LS 12 together as a single unit.

Housing plate 68 and support plate 30 are stationary components that are fixed together, and those components may be generally referred to herein as either a frame or frame member of LS 12.

Figure 19:
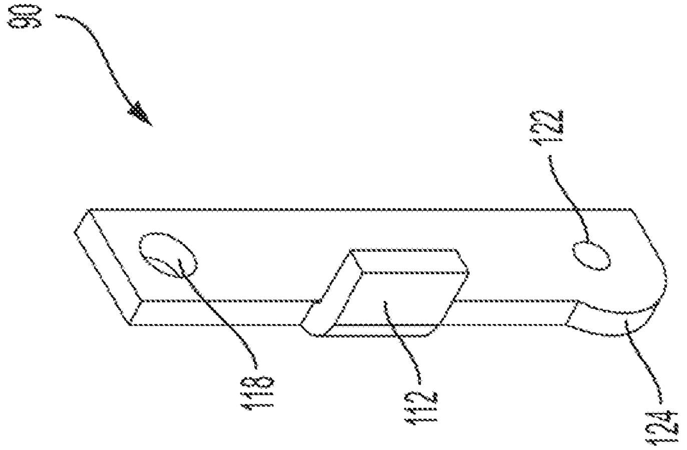
FIG. 19 depicts an isometric view of a release arm of the latch subassembly (LS) of FIGS. 3A-3C.
Figure 20:
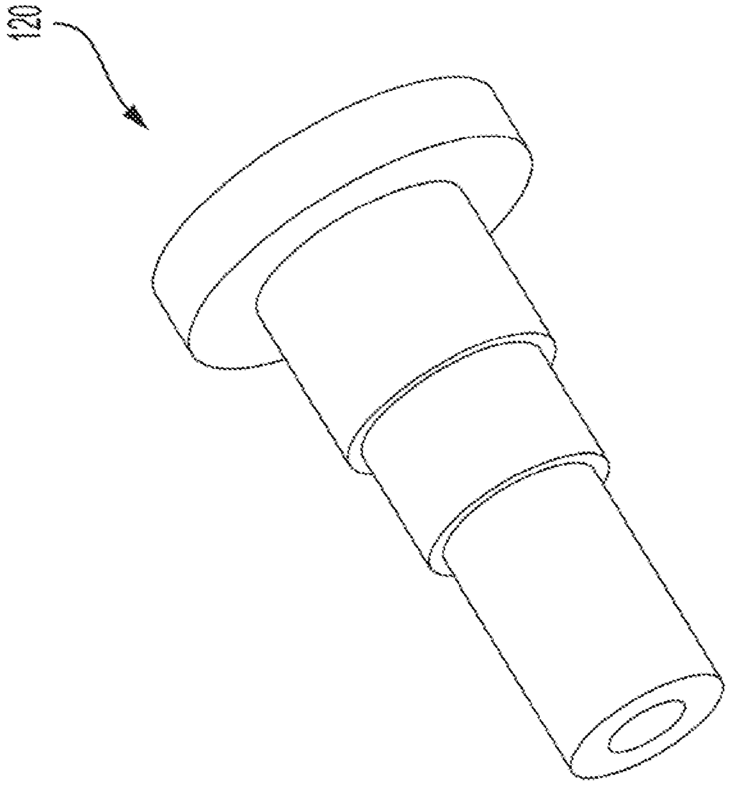
FIG. 20 depicts an isometric view of a stepped pin of the latch subassembly (LS) of FIGS. 3A-3C.
Figure 21:
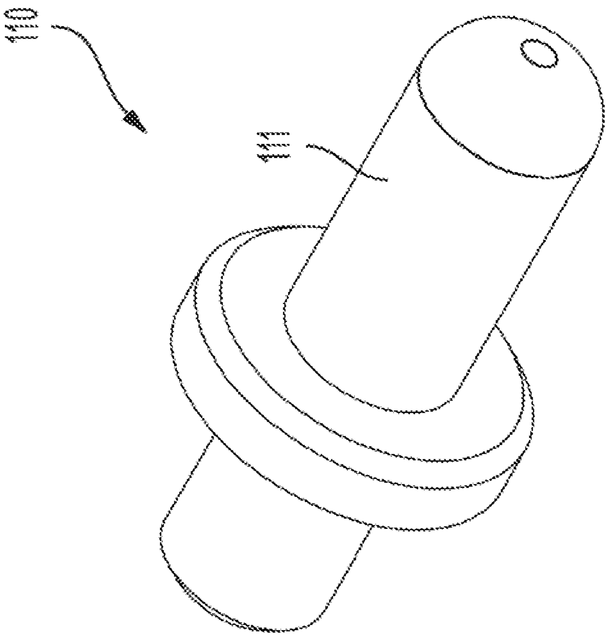
FIG. 21 depicts an isometric view of a pin of the latch subassembly (LS) of FIGS. 3A-3C.

Release arm 90, which is also shown in FIG. 19, is a bent sheet of material comprising an outwardly projecting bent tab 112 upon which a second leg 116 of spring 104 bears. As noted above, the first leg 102 of spring 104 bears on opening 100 of housing plate 68. An opening 118 is defined at the top end of release arm 90 through which a stepped pin 120 (FIG. 20) is inserted. Pin 120 is fixedly mounted to an opening in housing plate 68. The coiled portion of torsion spring 104 is positioned about pin 120. Release arm 90 is capable of pivoting about pin 120 under the bias of spring 104. An opening 122 is defined at the bottom end of release arm 90 through which a pin 110 (FIG. 21) is fixedly inserted. As noted above, surface 111 of pin 110 interacts with cam 21 of housing part 16 to cause unlocking and opening of LS 12 during operation of MU 24. A rounded surface 124 is defined at the bottom end of release arm 90 and is configured to interact with the surface 85 (FIG. 18B) of tab 84 of trigger 60, as shown in FIG. 3A.

Figure 22:
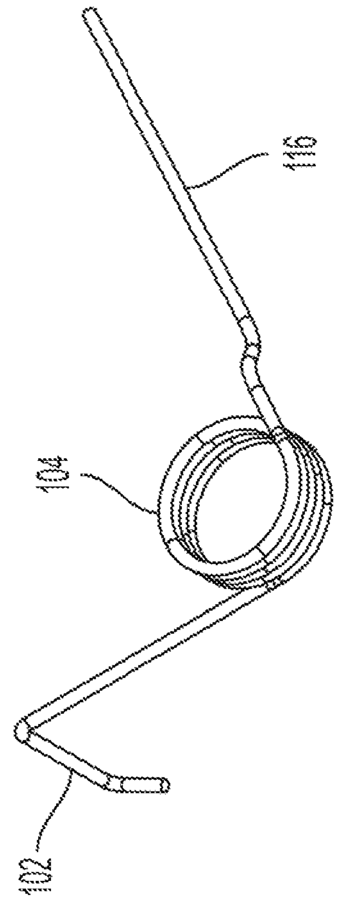
FIG. 22 depicts an isometric view of a torsion spring of the latch subassembly (LS) of FIGS. 3A-3C.

Torsion spring 104, which is depicted in FIG. 22, includes a coiled segment, first leg 102 that is positioned to bear on opening 100 of housing plate 68, and second leg 116 that is positioned to bear on tab 112 of release arm 90. Spring 104 biases release arm 90 in a clockwise direction (as viewed in FIG. 3A) such that the rounded surface 124 normally bears on surface 85 on tab 84 of trigger 60.

In assembled form of LS 12, components 30, 36*a/b* and 68 are stationary, whereas components 40, 60, 48*a/b*, 80, 104 and 90 are capable of pivoting or rotating with respect to the stationary components.

By way of non-limiting example, the components of LS 12 may be composed of either metal or plastic, and may be formed using a bending, machining casting or injection molding process.

Figure 2A:
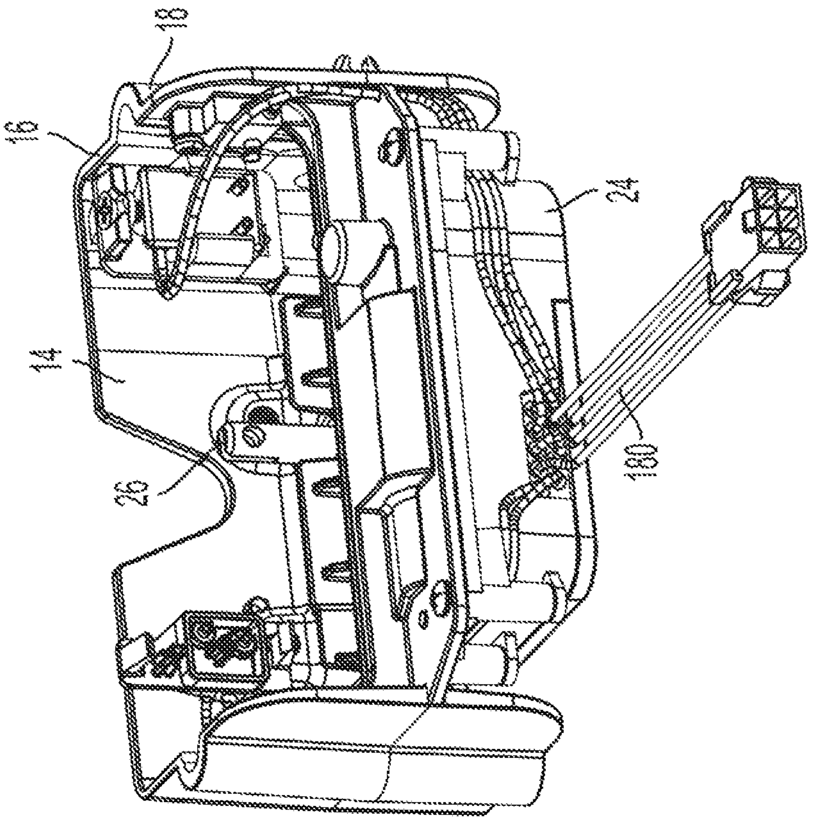
FIGS. 2A and 2B are isometric and exploded views, respectively, of a housing and motor unit (HMU) of the CLA of FIGS. 1A and 1B.
Figure 2B:
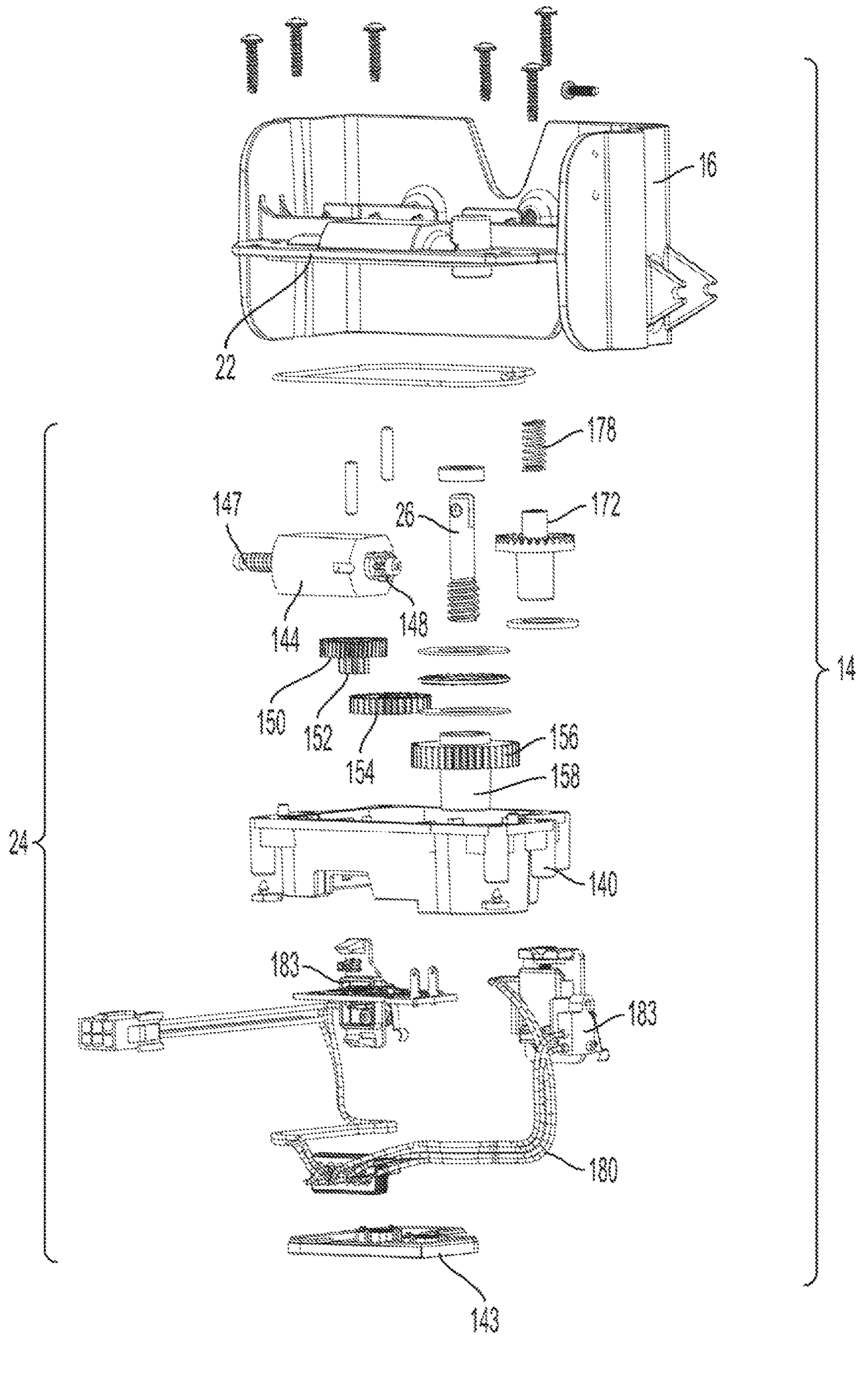
Figure 6A:
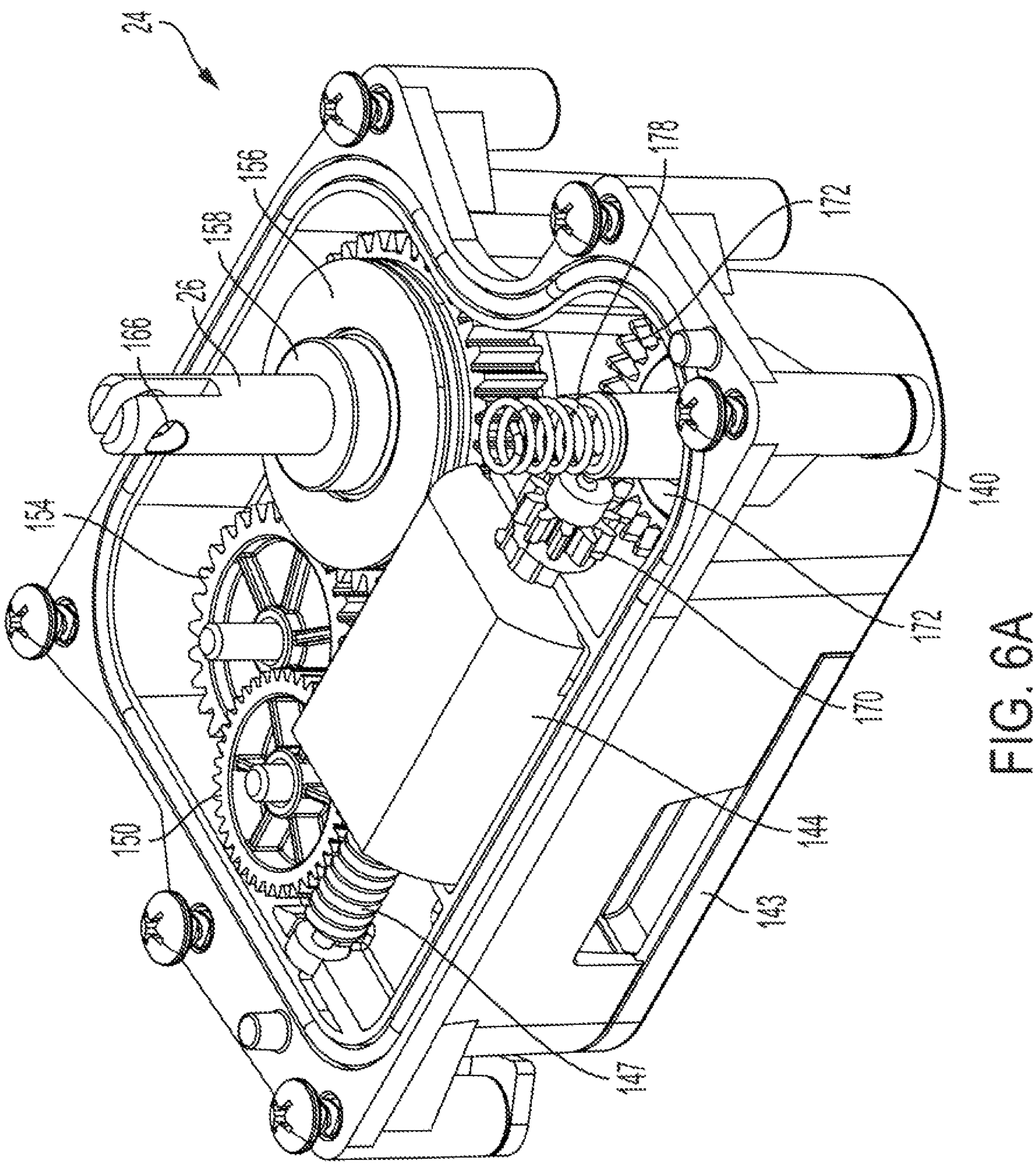
FIGS. 6A and 6B depict an isometric view and a top plan view, respectively, of a motor unit (MU) of the housing and motor unit (HMU) of FIGS. 2A and 2B.
Figure 6B:
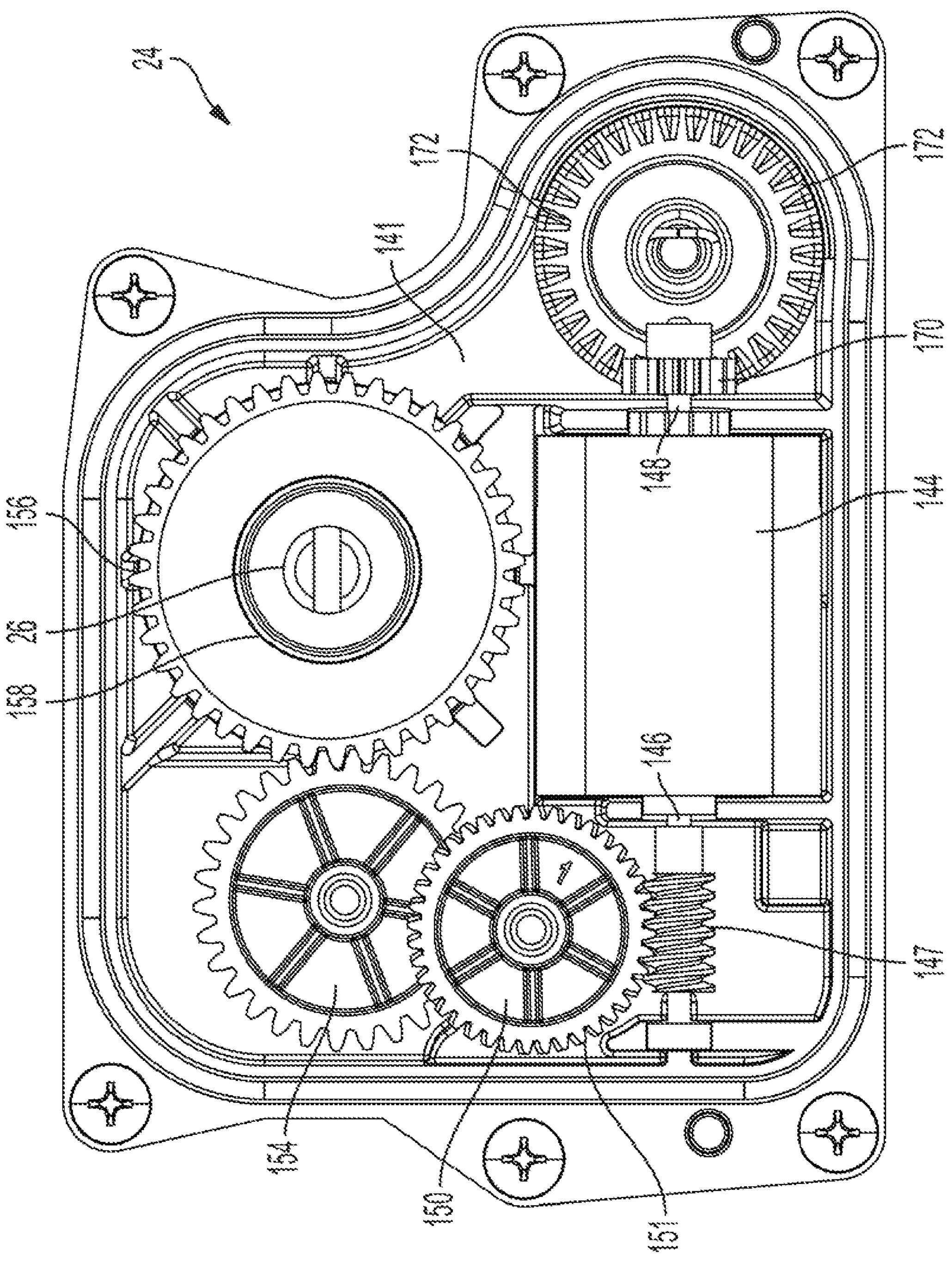
Figure 7B:
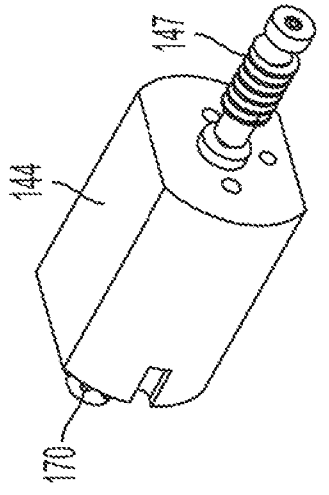
FIGS. 7A and 7B depict an exploded isometric view and an assembled isometric view, respectively, of a motor of the motor unit of FIG. 6A.
Figure 7A:
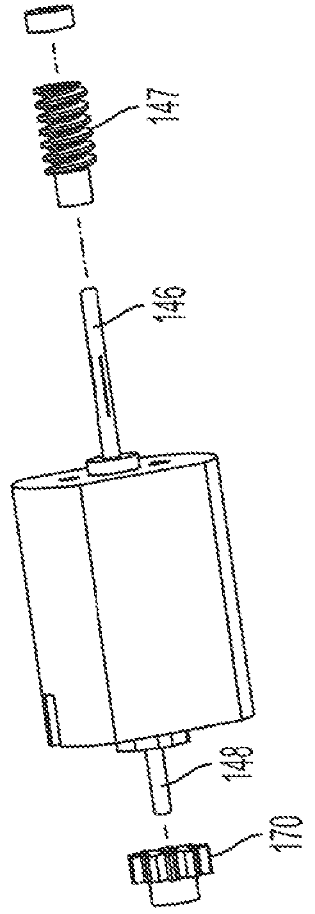
Figure 9:
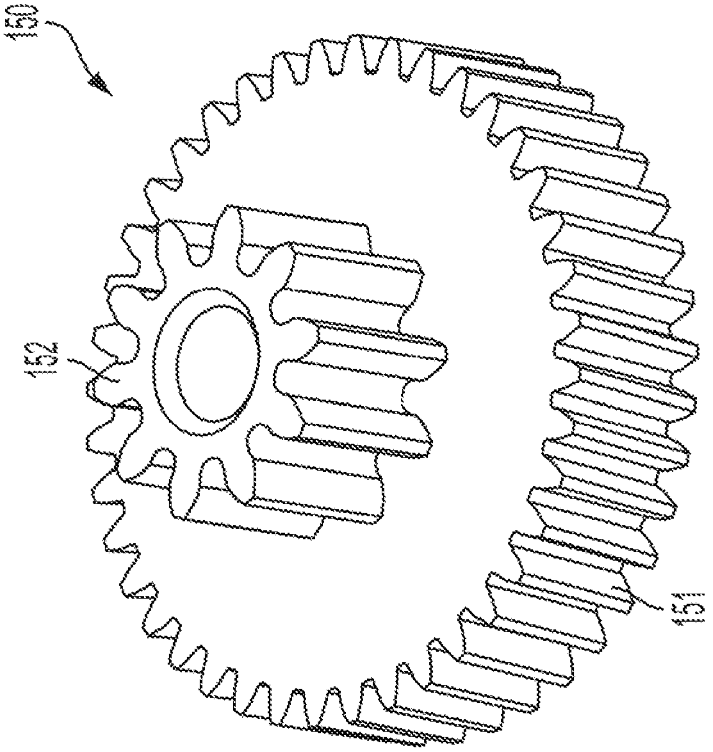
FIG. 9 depicts an isometric view of a gear of the motor unit of FIG. 6A.
Figure 10B:
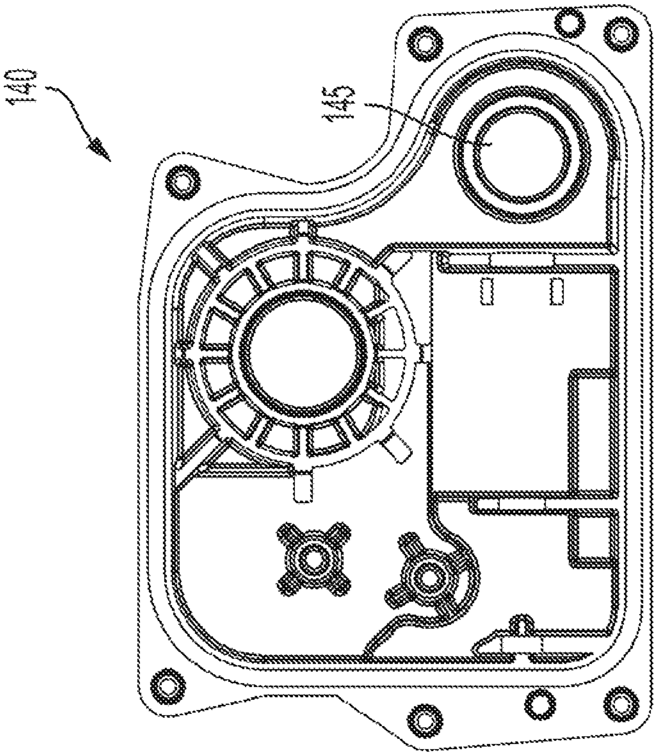
FIGS. 10A and 10B depict isometric and top plan views, respectively, of a housing of the motor unit of FIG. 6A.
Figure 10A:
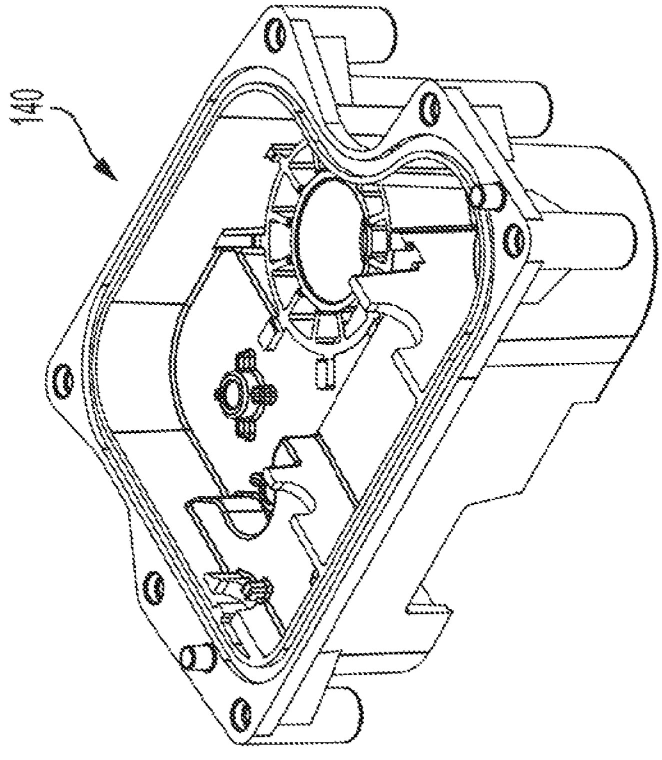
Figure 11:
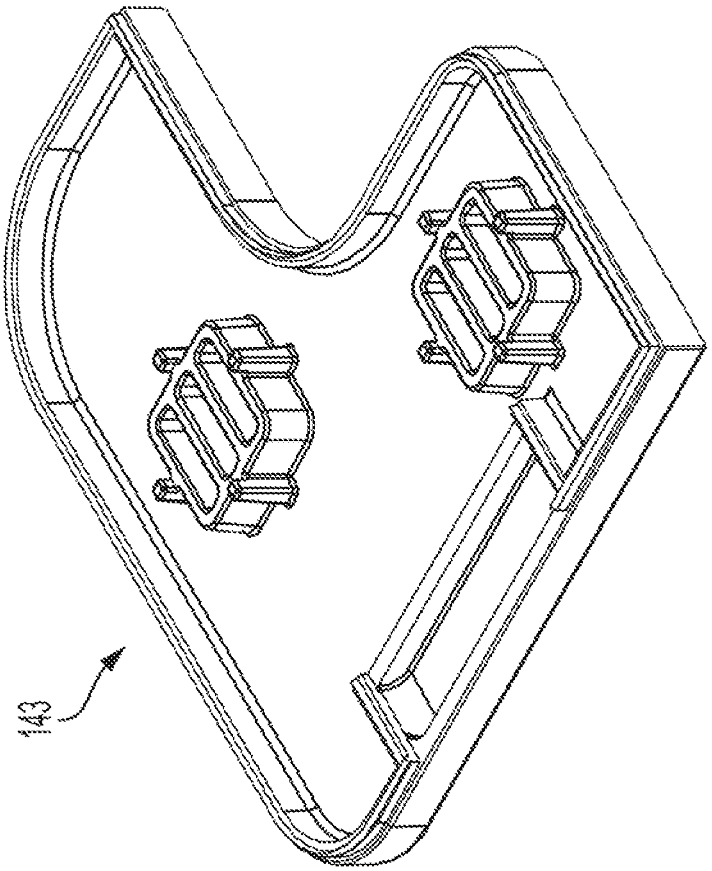
FIG. 11 depicts an isometric view of a cover of the motor unit of FIG. 6A.
Figure 12:
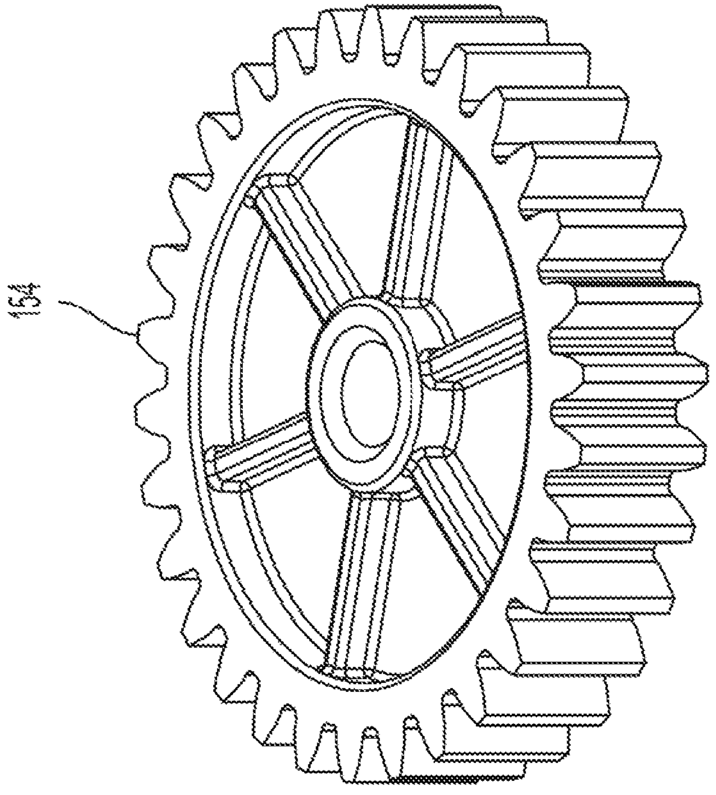
FIG. 12 depicts an isometric view of a gear of the motor unit of FIG. 6A.
Figure 13B:
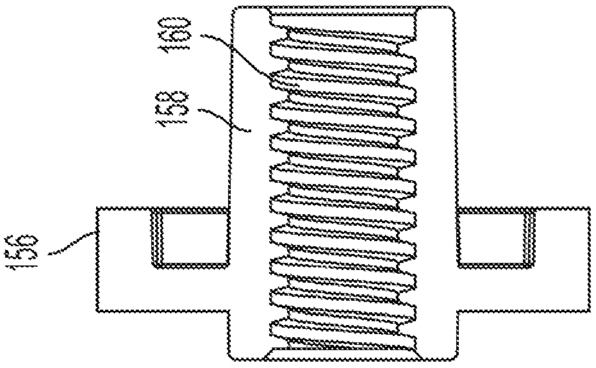
FIGS. 13A and 13B depict an isometric view and longitudinal cross-sectional view, respectively, of a gear of the motor unit of FIG. 6A.
Figure 13A:
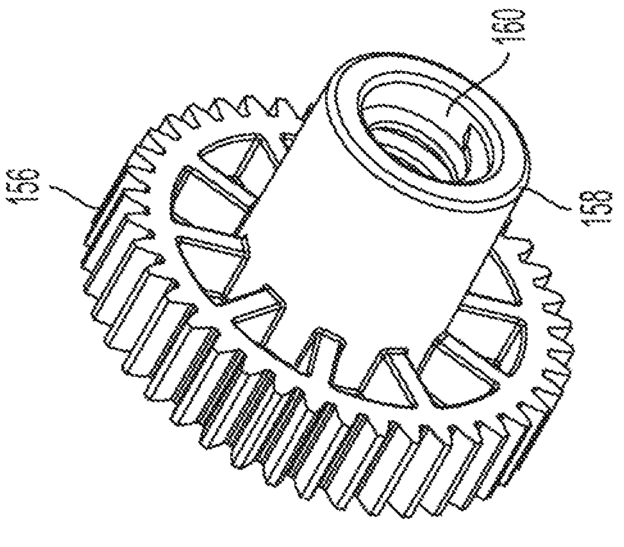

Referring now to the features of motor unit (MU) 24, and with reference to FIGS. 2B, 6A and 6B, MU 24 includes a box-shaped housing 140 (FIGS. 10A and 10B) having a hollow interior region for accommodating other components of MU 24. An opening 145 (FIG. 10B) is provided on the bottom side of housing 140 to provide access to a manually operable gear 172 using a standard tool, as will be described in greater detail later. A cover 143 (FIG. 11) is mounted to the bottom side of housing 140 for concealing an opening in the bottom side. A motor 144 (FIGS. 7A and 7B) is mounted in a channel defined within the interior housing 140. Motor 144 may be an electric motor, for example. Motor 144 includes an output shaft 146 and an input/output shaft 148. A worm 147 is coupled to output shaft 146. Teeth of worm 147 mesh with teeth 151 of gear 150 to cause rotation of gear 150. As shown in FIG. 9, gear 150 includes two different sets of gear teeth. The second set of gear teeth 152 of gear 150 mesh with the teeth of gear 154 (FIG. 12) to cause rotation of gear 154. The teeth of gear 154 mesh with teeth of gear 156 (FIGS. 13A and 13B) to cause rotation of gear 156. A hollow annular boss 158 protrudes from both sides of gear 156, and a threaded hole 160 is formed within boss 158.

Figure 14:
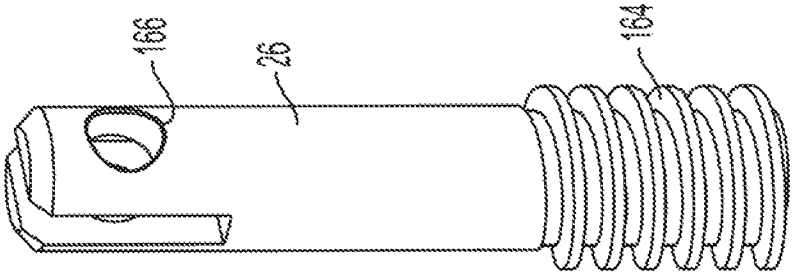
FIG. 14 depicts an isometric view of a threaded post of the motor unit (MU) of FIG. 6A.

Threaded post 26, which is also shown in FIG. 14, includes a cylindrical post having a lower threaded portion 164 and a bifurcated top portion having a radially extending opening 166 formed through the bifurcated top portion. Lower threaded portion 164 is threadedly mounted to threaded hole 160 of gear 156. In operation, rotation of gear 156 causes translation (without rotation) of threaded post 26 due to the threaded interface between those components. The top end of post 26 is fixedly mounted to plate 30 of LS 12 by positioning a fastener through hole 166 of post 26 and hole 32 of plate 30. Accordingly, it follows that rotation of output shaft 146 of motor 144 causes translation of LS 12. Stated differently, rotation of output shaft 146 in a first direction causes translation of LS 12 towards an extended state, whereas rotation of output shaft 146 in a second direction that is opposite to the first direction causes translation of LS 12 towards a retracted state. Moving LS 12 to the extended state, will cause LS 12 to unlock, as will be described in greater detail with respect to FIGS. 4A-4E.

Gears 147, 150, 154, 156 and shaft 26 may be referred to herein as a gear arrangement or transmission.

Figure 8B:
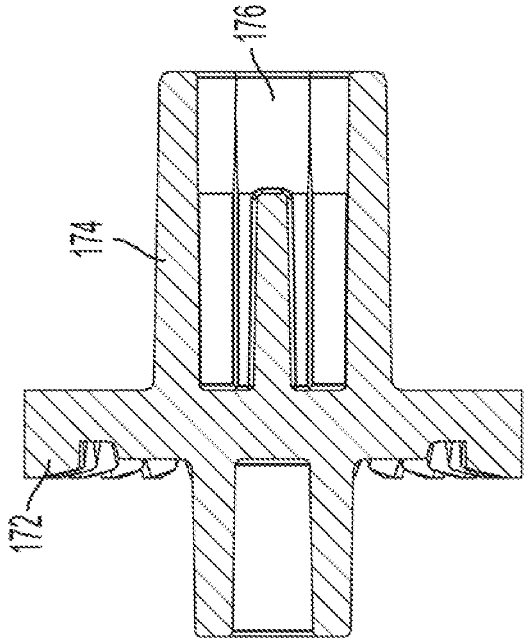
FIGS. 8A and 8B depict an isometric view and longitudinal cross-sectional view, respectively, of a gear of the motor unit of FIG. 6A.
Figure 8A:
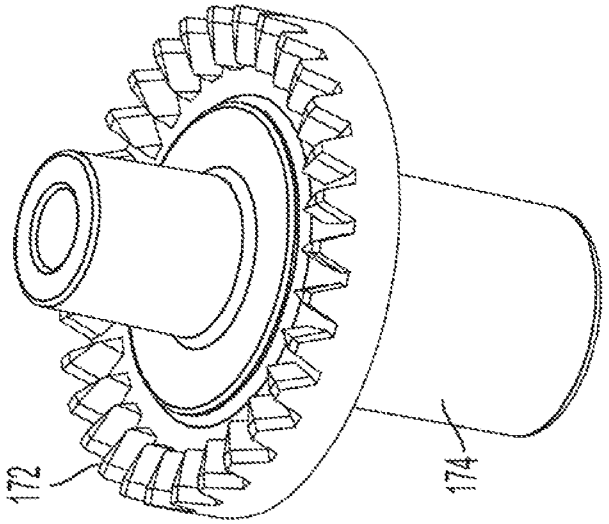

As noted above, motor 144 also includes an input/output shaft 148. Shaft 146/148 is a singular, solid, continuous shaft. A gear 170 is coupled to input/output shaft 148. Another gear 172 (FIGS. 8A and 8B) is rotatably mounted to housing 140 and is positioned adjacent gear 170. With reference to FIGS. 8A and 8B, gear 172 includes a cylinder having a set of vertically extending gear teeth at its periphery, a boss 174 extending from the cylinder, and a hollow region disposed in the boss 174. A tool receiving surface 176, such as a hex-shaped recess, is formed within the hollow region of the boss 174. It should be understood by those skilled in the art that the size and shape of the tool receiving surface 176 can vary, and can suit any type of standard tool, such as a screwdriver, wrench, driver, etc.

Gear 172 is mounted in a boss extending upwardly from the interior base surface 141 of housing 140, and gear 172 is configured to translate in a longitudinal direction along the length the boss. A spring 178 is sandwiched between the top side of gear 172 and the underside of shelf 22 of housing part 16 to bias gear 172 toward the interior base surface 141 (FIG. 6B) of housing 140. The significance of the spring-loaded gear 172 will be described with reference to FIGS. 1J and 1K.

Although gear 172 is shown and described as selectively meshing with gear 170, it should be understood that MU 24 may be modified such that gear 172 can selectively mesh with a different gear, such as one of gears 150, 152 or 156.

Spring 178 is best shown in FIGS. 26A-26D. Spring 178 is a coiled compression spring having a helical coiled body 179 that is wound about a longitudinal axis T and has a constant helical radius (as measured from axis T). The two free ends 185 of spring 178 do not follow the helical trajectory of the coiled body 179, however. Specifically, each end 185 is bent inwardly by about ninety degrees toward the interior space defined by the circumference of body 179. Friction between end 185 and post 174 retains end 185 on post 174. Prior to attaching MU 24 to housing part 16, it is possible to flip MU 24 assembly upside down without spring 178 detaching from gear 172 due to the friction between end 185 and post 174. Also, in the absence of bending ends 185 inwardly, end 185 could inadvertently dig into gear 172 upon rotating gear 172.

It should be understood that each gear described above is pivotably mounted within housing 140 by a pin or shaft and is configured to rotate about its own axis.

A power and signal cable assembly 180 (cable 180, hereinafter) delivers power and signal to CLA 10. A processor/controller is attached to cable 180 and positioned within CLA 10, or the processor/controller may be connected to cable 180 and positioned outside of CLA 10. A connector 181 is mounted to the end of cable 180 for connecting to a remote controller either having or providing a power source (for example) and a release signal. Cable 180 is connected to (at least) (i) motor 144 for delivering power thereto, and (ii) sensors 183 for sensing the longitudinal position of LS 12 and the position of pawl 80. Specifically, cable 180 is electrically connected to those components via a printed circuit assembly (PCA) with a microcontroller on the board. The sensors 183 may be proximity sensors or limit switches, for example, or any other type of sensor that is configured to sense motion or position of a moveable component.

Figure 4A:
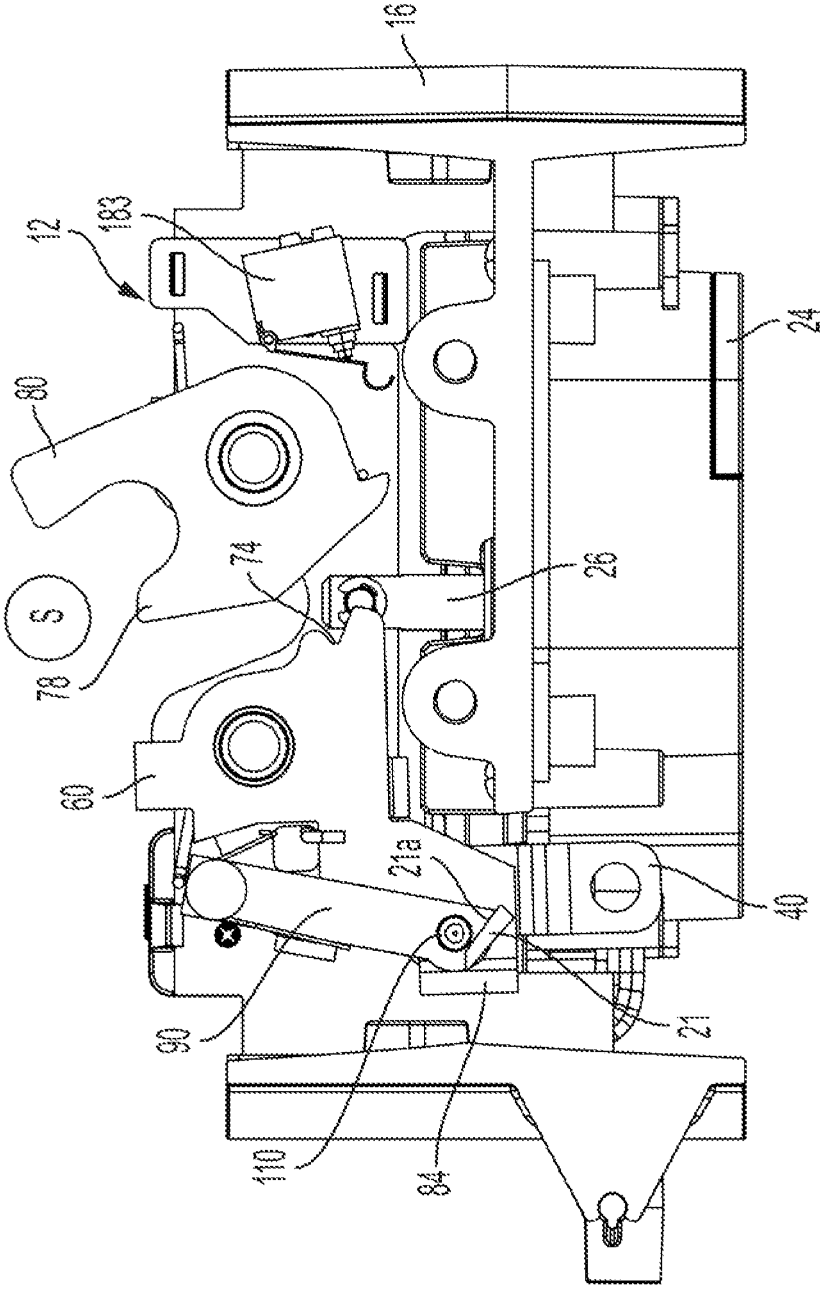
FIGS. 4A-4E are rear elevation views of the CLA of FIGS. 1A and 1B with various components omitted to show motion of the CLA between open and closed states as well as extended and retracted states.
Figure 4B:
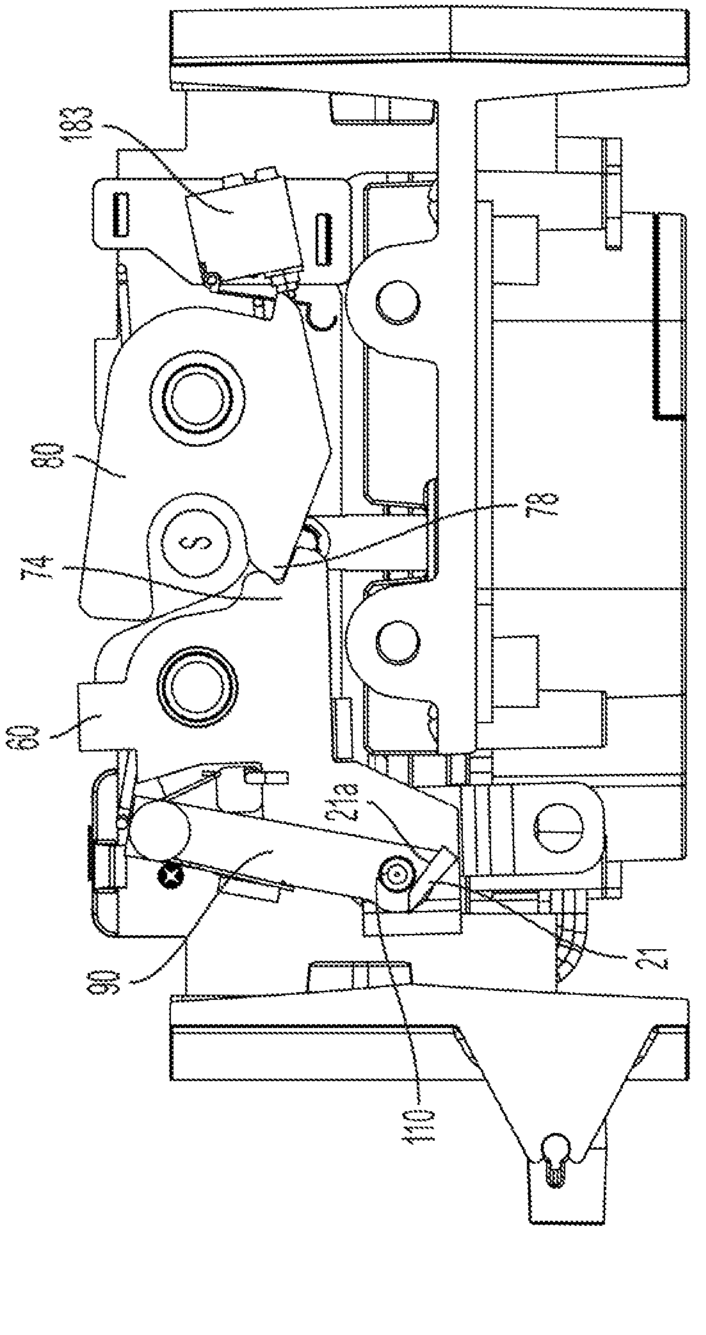
Figure 4C:
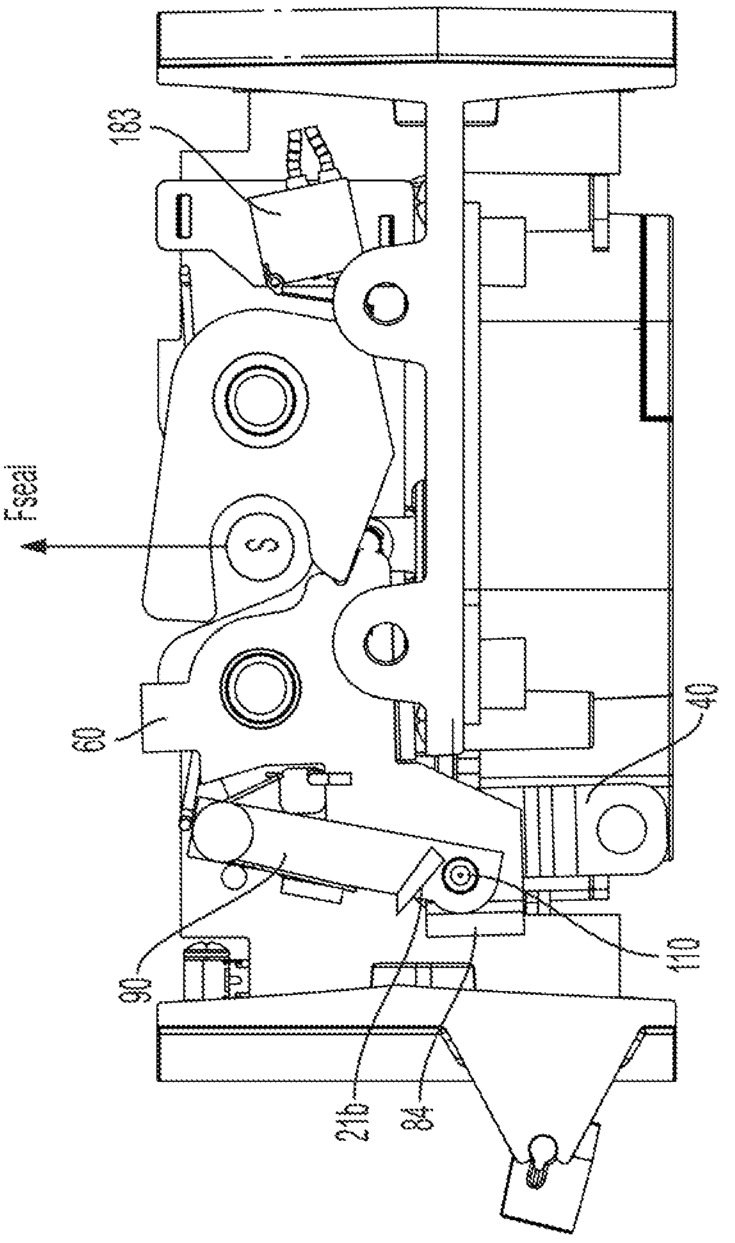
Figure 4D:
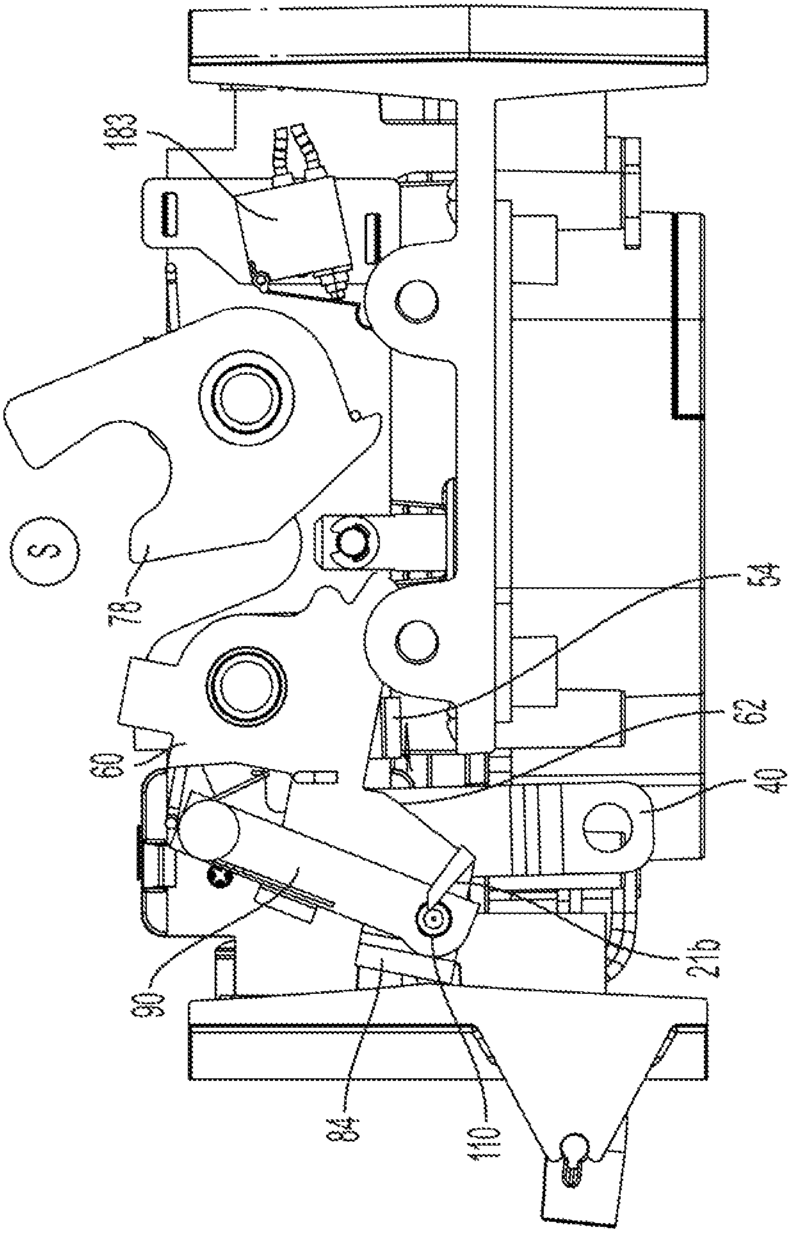

Referring now to operation of CLA 10 shown in FIGS. 4A-4E, CLA 10 is initially shown in an open, fully extended and unlocked state in FIG. 4A. In this state, pawl 80 is rotated to an open position and ready to receive the striker S. Trigger 60 is in a home position ready to receive pawl 80.

Turning to FIG. 4B, the end-user moves striker S into pawl 80, causing pawl 80 to rotate in the counterclockwise direction until nose 78 of pawl 80 enters notch 74 of trigger 60, thereby locking pawl 80 and trigger 60 together. At this stage, pin 110 of release arm 90 bears on the top side 21*a* of cam 21 of housing 16 due to the biasing action of spring 104. Also, at this stage, LS 12 is maintained in a closed and locked state, as well as in an extended state. A sensor or switch 183 connected to the PCA senses the locked rotational position of pawl 80, and transmits the "locked" signal via sensors or wires to a controller. If a user were to attempt to remove striker S from the locked CLA 10, then rotation of trigger 60 (and, thus, rotation of pawl 80) would be prevented by the interaction between nose 78 of pawl 80 and notch 74 of trigger 60 as described above.

Turning now to FIG. 4C, once the controller receives the "locked" signal, the controller then activates motor 144 of MU 24 to move LS 12 from the fully-extended position toward a retracted position. Motor 144 rotates output shaft 146 in a first rotational direction, which ultimately causes downward translation of shaft 26 as well as LS 12, which is fixedly connected to shaft 26. Operation of MU24 was described above. As LS 12 moves downward, release arm 90 rotates in a counterclockwise direction (as viewed in FIG. 4C) against the bias of spring 104 as pin 110 slides downward along top side 21*a* of cam 21. Once release arm 90 reaches the bottom end of cam 21, spring 104 moves release arm 90 in a clockwise direction to the position shown in FIG. 4C. In this position, pin 110 is positioned below the bottom side 21*b* of the stationary cam 21. The pin 110 may contact cam 21. Movement of release arm 90 is stopped once surface

124 of release arm 90 contacts tab 84 of trigger 60. It should be understood that trigger 60 does not rotate along with release arm 90 at this stage. The spring force of spring 104 is not great enough to move trigger 60 in a clockwise direction because the spring force of spring 48A, which biases trigger 60 in a counterclockwise direction, is greater than that of spring 104. Additionally, it should also be understood that trigger 60 is prevented from rotating counterclockwise from its home position shown in FIGS. 4A-4C due to the engagement between nose 78 of pawl 80 and notch 74 of trigger 60 (see FIG. 4B).

At the stage shown in FIG. 4C, LS 12 is maintained in a closed and locked state, as well as a retracted state. In the retracted state, the seal (not shown) between the door (to which the striker S is attached) and the housing (not shown) to which the door and CLA 10 are attached is compressed. The compression of the seal, by default imparts a force (Fseal) on the striker in the direction shown.

A sensor or switch connected to a controller senses the retracted state of LS 12, and transmits the "retracted" signal via the sensor wires to a controller. The controller deactivates motor 144 to prevent over-travel of LS 12.

Turning now to FIG. 4D, to move CLA 10 from the locked and retracted state to an unlocked and extended state, a user either depresses or selects a button, icon, keypad or other device intended for unlocking CLA 10, which transmits an "unlock" signal to a controller that is connected to CLA 10. Upon receiving the "unlock" signal, the controller then activates motor 144 of MU 24 to move LS 12 from the fully-retracted position toward the extended position. Motor 144 rotates output shaft 146 in a second rotational direction (opposite to the first rotational direction), which ultimately causes upward translation of shaft 26 as well as LS 12 that is fixedly connected to shaft 26. Operation of MU 24 was described above.

Pin 110 of release arm 90 moves upward along with the other components of LS 12. As LS 12 moves upward, the pin 110 of release arm 90, which is positioned between the bottom side 21*b* of stationary cam 21 and the moveable tab 84 of trigger 60, forces the tab 84 of trigger 60 to rotate in a clockwise direction (as viewed in FIG. 4D) against the bias of spring 48*a*. The pin 110 then slides upwardly along the bottom side 21*b* of stationary cam 21 as the trigger 60 continues to rotate in the clockwise direction against the bias of spring 48*a*. It is noted that MOT 40 does not rotate along with trigger 60 because those components are detached. The trigger 60 ultimately rotates to a position whereby notch 74 of trigger 60 separates from nose 78 of pawl 80, thereby unlocking pawl 80 from trigger 60. Pawl 80 can auto-rotate to the open position under the bias of spring 48*b*. The striker S can now be removed from CLA 10. Motor 144 continues to operate until sensor senses that LS 12 has moved to the fully-extended position. Upper limit switch transmits a signal to the controller, which deactivates motor 144. Additionally, a shoulder 73 (FIG. 18A) contacts the underside of arm 106 of housing 68 to prevent further rotation of trigger 60 in the clockwise direction.

Turning back to FIG. 4A, once pin 110 of release arm 90 reaches the top end of cam 21, the bottom end of release arm 90 no longer blocks the spring-biased movement of trigger 60. Thus, spring 48*a* causes trigger 60 to rotate in a counterclockwise direction back to the home position shown in FIG. 4A. Release arm 90 also moves to the position shown in FIG. 4A under the bias of spring 48*a* (and against the bias of spring 104).

There are other ways to unlock CLA 10 in the event of a power failure or other emergency. According to a first method for unlocking CLA 10 in the event of a power failure, and starting from FIG. 4C, for example, CLA 10 is initially in a locked, closed and fully-retracted state. Turning now to FIG. 4E, in the event of a power failure, a user can move a cable 'C' in the direction depicted by the arrow to unlock CLA 10. More particularly, the cable C is connected to MOT 40. Pulling the cable C in the direction depicted by the arrow in FIG. 4E causes tab 54 of MOT 40 to bear on trigger 60, which results in both MOT 40 and trigger 60 rotating in a clockwise direction against the bias of spring 48*a*. The trigger 60 ultimately rotates to a position whereby notch 74 of trigger 60 separates from nose 78 of pawl 80, thereby unlocking pawl 80 from trigger 60, as shown in FIG. 4E. Pawl 80 will auto-rotate to the open position under the bias of spring 48*b*. The striker S can now be removed from CLA 10. Once the user releases the cable C, MOT 40 and trigger 60 return to their home positions shown in FIG. 4C under the bias of spring 48*a*.

Figure 1J:
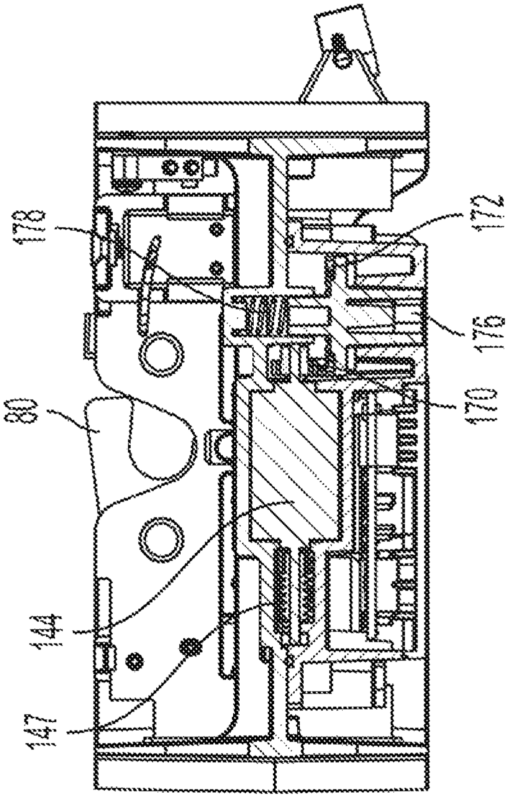
FIG. 1J is a cross-sectional view of the CLA shown in FIG. 1J and taken along the lines 1I-1I, wherein the CLA is shown being operated in a normal configuration.
Figure 1K:
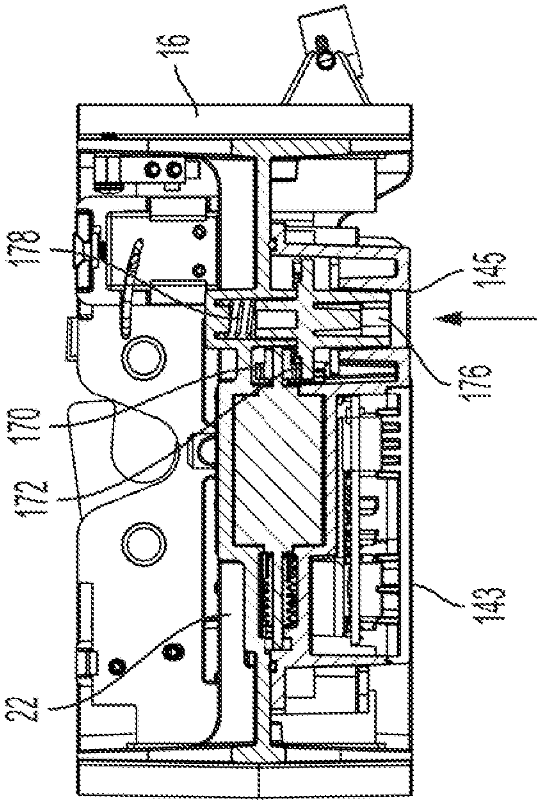
FIG. 1K is a cross-sectional view of the CLA like that shown in FIG. 1J, wherein the CLA is shown operated in a manual configuration.

Turning now to FIGS. 1J and 1K, and according to a second method for unlocking CLA 10 in the event of a power failure, motor 144 can be manually operated to move LS 12 to the extended position, which unlocks CLA 10. More particularly, as shown in FIG. 1J, in normal operation of CLA 10, the teeth of gear 170 are separated apart and detached from the teeth of gear 172 due to the bias of spring 178. Thus, in normal operation, gear 172 does not rotate and is not rotated by gear 170. Referring now to FIG. 1K, in the event of power loss or failure of motor 144, circuitry or other component of MU 24, a user of CLA 10 can manually operate CLA 10 using a standard tool by depressing and then rotating gear 172 to unlock CLA 10. More particularly, a user can insert a tool (such as a hex driver attached to an electric drill) through hole 145 (FIG. 10B) and into the tool receiving surface 176 of gear 172. The user then depresses gear 172 in the direction of the arrow shown in FIG. 1K against the bias of spring 178 so that the teeth of gear 172 engage and mesh with the teeth of gear 170. The user then rotates the tool, which causes gear 172 to rotate gear 170, which causes rotation of gear 147, which ultimately causes upward translation of LS 12, as described above, which results in unlocking of CLA 10. When the tool is removed from gear 172, the gear 172 returns to the position shown in FIG. 1J under the bias of spring 178.

In addition to manually unlocking CLA 10, the above described gear 172 can be used to (ii) reduce the compression of the seal between the door and the housing, or (iii) increase the compression of the seal between the door and the housing. Rotation of gear 172 in a first direction causes translation of LS 12 towards an extended state which reduces the compression of the seal, whereas rotation of gear 172 in a second direction that is opposite to the first direction causes translation of LS 12 towards a retracted state which increases the compression of the seal.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A compression latch assembly (CLA) comprising:

a housing including a cam surface;

a latch subassembly that is movably mounted to the housing, said latch subassembly comprising (i) a frame, (ii) a pawl pivotably connected to said frame and biased to move from a closed position to an open position, said pawl including a surface that is configured for receiving a striker, (iii) a trigger pivotably connected to said frame and movable between a home position in which the trigger is positioned to retain said pawl in the closed position, and a release position in which the trigger is not positioned to retain said pawl in the closed position, and (iv) a release arm pivotably connected to said frame and biased to engage said trigger, said release arm having a cam follower that is positioned to engage said cam surface of said housing;

a motor unit mounted to the housing for moving the latch subassembly with respect to the housing between extended and retracted positions, wherein in the course of moving the latch subassembly from the retracted position to the extended position, the cam surface is configured to urge the cam follower to rotate the trigger from the home position to the release position, which causes the trigger to release the pawl, which causes the pawl to move to the open position;

wherein the latch subassembly further comprises a manual override trigger (MOT) that is connected to said frame and movable between a MOT home position and an override position in which the MOT has moved the trigger to the release position; and wherein the MOT includes a surface that is configured to releasably engage the trigger.

2. The CLA of claim 1, wherein in the course of moving the latch subassembly from the extended position to the retracted position, the cam surface is configured to separate the release arm from the trigger.

3. The CLA of claim 1, wherein the trigger and MOT are configured such that the trigger is movable between the home and release positions at any point of the latch operation.

4. The CLA of claim 1, wherein the latch subassembly further comprises a spring that is configured to bias the release arm against said trigger.

5. The CLA of claim 1, wherein the latch subassembly further comprises a spring that is configured to bias the pawl to the open position.

6. The CLA of claim 1, wherein the latch subassembly further comprises a spring that is configured to bias the trigger to the home position.

7. The CLA of claim 1, wherein the latch subassembly further comprises a first spring that is configured to bias the release arm against said trigger, and a second spring that is configured to bias the trigger to the home position, wherein a spring force of the second spring is greater than that of the first spring.

8. The CLA of claim 1, wherein the entire latch subassembly moves between the extended and retracted positions.

9. A storage compartment comprising the latch of claim 1.

10. The storage compartment of claim 9 further comprising (i) a door that is movably mounted to said storage compartment for concealing an opening defined in the storage compartment, and (ii) a compressible seal that is positioned, in a closed state of the door, about the opening of the storage compartment and between the door and a door mounting surface of the storage compartment.

11. A latch subassembly of the compression latch assembly (CLA) of claim 1, said latch subassembly comprising:

a frame, a pawl pivotably connected to said frame and biased to move from a closed position to an open position, said pawl including a surface that is configured for receiving a striker, a trigger pivotably connected to said frame and movable between a home position in which the trigger is positioned to retain said pawl in the closed position, and a release position in which the trigger is not positioned to retain said pawl in the closed position, and a release arm pivotably connected to said frame and biased to engage said trigger, said release arm having a cam follower that is configured to engage a cam of the CLA, wherein the latch subassembly is configured to move between extended and retracted positions, wherein in the course of moving the latch subassembly from the retracted position to the extended position, the cam follower is configured to be urged by the cam to rotate the trigger from the home position to the release position, which causes the trigger to release the pawl, which causes the pawl to move to the open position.

12. The latch subassembly of claim 11, wherein in the course of moving the latch subassembly from the extended position to the retracted position, the cam is configured to separate the release arm from the trigger.

13. The latch subassembly of claim 11, wherein the latch subassembly further comprises a manual override trigger (MOT) that is connected to said frame and movable between a MOT home position and an override position in which the MOT has moved the trigger to the release position, which causes the pawl to move to the open position.

14. The latch subassembly of claim 11, wherein the latch subassembly further comprises a first spring that is configured to bias the release arm against said trigger, and a second spring that is configured to bias the trigger to the home position, wherein a spring force of the second spring is greater than that of the first spring.

15. A compression latch assembly (CLA) comprising:

a housing including a cam surface;

a latch subassembly that is movably mounted to the housing, said latch subassembly comprising (i) a frame, (ii) a pawl pivotably connected to said frame and biased to move from a closed position to an open position, said pawl including a surface that is configured for receiving a striker, (iii) a trigger pivotably connected to said frame and movable between a home position in which the trigger is positioned to retain said pawl in the closed position, and a release position in which the trigger is not positioned to retain said pawl in the closed position, and (iv) a release arm pivotably connected to said frame and biased to engage said trigger, said release arm having a cam follower that is positioned to engage said cam surface of said housing;

a motor unit mounted to the housing for moving the latch subassembly with respect to the housing between extended and retracted positions, wherein in the course of moving the latch subassembly from the retracted position to the extended position, the cam surface is configured to urge the cam follower to rotate the trigger from the home position to the release position, which causes the trigger to release the pawl, which causes the pawl to move to the open position;

wherein the latch subassembly further comprises a manual override trigger (MOT) that is connected to said frame and movable between a MOT home position and an override position in which the MOT has moved the trigger to the release position; and wherein the latch subassembly further comprises a spring that is configured to bias the trigger to the home position and the MOT to the MOT home position.

16. A compression latch assembly (CLA) comprising:

a housing including a cam surface;

a latch subassembly that is movably mounted to the housing, said latch subassembly comprising (i) a frame, (ii) a pawl pivotably connected to said frame and biased to move from a closed position to an open position, said pawl including a surface that is configured for receiving a striker, (iii) a trigger pivotably connected to said frame and movable between a home position in which the trigger is positioned to retain said pawl in the closed position, and a release position in which the trigger is not positioned to retain said pawl in the closed position, and (iv) a release arm pivotably connected to said frame and biased to engage said trigger, said release arm having a cam follower that is positioned to engage said cam surface of said housing;

a motor unit mounted to the housing for moving the latch subassembly with respect to the housing between extended and retracted positions, wherein in the course of moving the latch subassembly from the retracted position to the extended position, the cam surface is configured to urge the cam follower to rotate the trigger from the home position to the release position, which causes the trigger to release the pawl, which causes the pawl to move to the open position; and wherein the motor unit comprises (i) a motor having an output shaft that is either directly or indirectly connected to the frame of the latch subassembly for moving the latch subassembly with respect to the housing between extended and retracted positions, and (ii) a manually operable gear that is movable between a first position in which the manually operable gear does not mesh with a gear that is non-rotatably connected to the output shaft and rotation of the manually operable gear does not cause rotation of the output shaft, and a second position in which the manually operable gear meshes the gear that is non-rotatably connected to the output shaft and rotation of the manually operable gear causes rotation of the output shaft.

17. The CLA of claim 16, further comprising a spring that is configured to bias the manually operable gear to the first position.

18. The CLA of claim 17, wherein the spring is a coiled body having at least one inwardly bent end, said inwardly bent end being connected to the manually operable gear for retaining the spring on the manually operable gear.

19. A method for operating a compression latch assembly (CLA), said method comprising:

activating a motor unit, which causes a latch subassembly to move from a retracted position toward an extended position, which causes a cam follower on a release arm to bear on one surface of a stationary cam, which causes the release arm to bear on and pivot a trigger, which causes the trigger to move to a release position in which the trigger separates from a pawl and the pawl moves to an open position;

moving a manually operable gear from a first position in which the manually operable gear does not mesh with a gear that is non-rotatably connected to an output shaft of the motor unit to a second position in which the manually operable gear meshes the gear that is non-rotatably connected to the output shaft; and rotating the manually operable gear while the manually operable gear is maintained in the second position such that the manually operable gear causes rotation of the output shaft of the motor unit which causes the latch subassembly to move between the retracted position and the extended position.

20. The method of claim 1 further comprising re-activating the motor unit, which causes the latch subassembly to move from the extended position toward the retracted position, which causes the release arm to separate from the trigger.

21. The method of claim 19, wherein the CLA includes a manual override trigger (MOT) that is movable between a MOT home position and an override position in which the MOT has moved the trigger to the release position, wherein the step of activating the motor unit to move the trigger to the release position does not move the MOT.

* * * * *